(12) United States Patent
Torii et al.

(10) Patent No.: US 11,449,296 B2
(45) Date of Patent: Sep. 20, 2022

(54) DISPLAY SYSTEM, DISPLAY METHOD, AND PROGRAM

(71) Applicant: SEIKO EPSON CORPORATION, Tokyo (JP)

(72) Inventors: Shinya Torii, Azumino (JP); Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/131,919

(22) Filed: Dec. 23, 2020

(65) Prior Publication Data

US 2021/0200497 A1    Jul. 1, 2021

(30) Foreign Application Priority Data

Dec. 26, 2019   (JP) ............................. JP2019-235893

(51) Int. Cl.
  *G06F 3/041*  (2006.01)
  *G06F 3/04886*  (2022.01)
  *G06F 3/14*  (2006.01)
(52) U.S. Cl.
  CPC .......... *G06F 3/1423* (2013.01); *G06F 3/0416* (2013.01); *G06F 3/04886* (2013.01)
(58) Field of Classification Search
  CPC . G06F 16/1423; G06F 16/167; G06F 16/0488
  See application file for complete search history.

(56) References Cited

U.S. PATENT DOCUMENTS

| 2015/0015479 | A1* | 1/2015 | Cho ..................... G06F 3/1423 345/156 |
| 2015/0212681 | A1* | 7/2015 | Shinozaki ........... G06F 3/04842 345/8 |
| 2017/0308258 | A1* | 10/2017 | Xu ......................... G06F 13/14 |
| 2017/0337897 | A1* | 11/2017 | Jung ...................... G06F 3/013 |
| 2018/0150996 | A1* | 5/2018 | Gatta ..................... G06F 3/012 |
| 2019/0056813 | A1* | 2/2019 | Fukuda .............. G06F 3/04883 |
| 2019/0196185 | A1 | 6/2019 | Kimura |

FOREIGN PATENT DOCUMENTS

JP   2019-114050 A   7/2019

* cited by examiner

*Primary Examiner* — Ryan A Lubit
(74) *Attorney, Agent, or Firm* — Oliff PLC

(57) ABSTRACT

The display system includes an HMD and a control device. The display system includes a plurality of display modes including a first display mode in which display on an image display unit and display on a touch panel are common and a second display mode in which display on the image display unit and display on the touch panel are different from each other. A first state, a second state, and a third state are capable of being executed, the first state being a state in which at least any one of display on the image display unit and display on the touch panel is stopped, the second state being a state of requesting a specific operation, and the third state being a state in which an application is executable. During specific transition from the first state, the second state, or the third state to another state, the first display mode is set.

11 Claims, 15 Drawing Sheets

DISPLAY SYSTEM, DISPLAY METHOD, AND PROGRAM

The present application is based on, and claims priority from JP Application Serial Number 2019-235893, filed Dec. 26, 2019, the disclosure of which is hereby incorporated by reference herein in its entirety.

BACKGROUND

1. Technical Field

The present disclosure relates to a display system, a display method, and a program.

2. Related Art

Hitherto, in a configuration in which an HMD is coupled to a processing device, there has been disclosed a technique of displaying a display image of the processing device on the HMD and switching the display image of the processing device to user interface display (for example, see JP-A-2019-114050). In the configuration described in JP-A-2019-114050, two display units are linked to each other to improve usability is improved.

In the configuration described in JP-A-2019-114050, an operation on the user interface is performed with the processing device. Thus, a user wearing the HMD is required to perform an operation while viewing the display image of the processing device. Therefore, in a case of using the two display units, it is desired to enable a more intuitive operation.

SUMMARY

An aspect for solving the above-mentioned problem is display system including a display device including a first display unit, and a control device to be coupled to the display device, the control device including a second display unit and a touch sensor arranged in an overlapping manner with the second display unit, wherein the display system includes a plurality of display modes including a first display mode in which display on the first display unit and display on the second display unit are common and a second display mode in which display on the first display unit and display on the second display unit are different from each other, a first state, a second state, and a third state are capable of being executed, the first state being a state in which at least any one of display on the first display unit and display on the second display unit is stopped, the second state being a state of requesting a specific operation, and the third state being a state in which an application is executable, and during specific transition from the first state, the second state, or the third state to another state, the first display unit and the second display unit are in the first display mode.

An aspect for solving the above-mentioned problem is a display system including a head-mounted display device to be mounted on a head of a user, the head-mounted display device including a first display unit, and a control device to be coupled to the head-mounted display device, the control device including a second display unit and a touch sensor arranged in an overlapping manner with the second display unit, wherein the display system includes a plurality of display modes including a first display mode in which display on the first display unit and display on the second display unit are common and a second display mode in which display on the first display unit and display on the second display unit are different from each other, as operation states of the display system, a first state, a second state and a third state are capable of being executed, the first state being a state in which at least any one of display on the first display unit and display on the second display unit is stopped, the second state being a state of requesting a specific operation, and the third state being a state in which an application is executable, and when a specific transition is made between the operation states of the display system, the first display unit and the second display unit are in the first display mode.

Another aspect for further solving the above-mentioned problem is a display method performed by a display device including a first display unit and a control device to be coupled to the display device, the control device including a second display unit and a touch sensor arranged in an overlapping manner with the second display unit, the display method including executing a plurality of display modes including a first display mode in which display on the first display unit and display on the second display unit are common and a second display mode in which display on the first display unit and display on the second display unit are different from each other, performing transition between a first state, a second state, and a third state, the first state being a state in which at least any one of display on the first display unit and display on the second display unit is stopped, the second state being a state of requesting a specific operation, and the third state being a state in which an application is executable, and setting the first display unit and the second display unit in the first display mode, during specific transition from the first state, the second state, or the third state to another state.

Another aspect for further solving the above-mentioned problem is a program capable of being executed by a computer configured to control a control device being coupled to a display device including a first display unit, the control device including a second display unit and a touch sensor arranged in an overlapping manner with the second display unit, the program capable of switching a plurality of display modes including a first display mode in which display on the first display unit and display on the second display unit are common and a second display mode in which display on the first display unit and display on the second display unit are different from each other, switching and executing a first state, a second state, and a third state, the being a state in which at least any one of display on the first display unit and display on the second display unit is stopped, the second state being a state of requesting a specific operation, and the third state being a state in which an application is executable, and setting the first display unit and the second display unit in the first display mode, during specific transition from the first state, the second state, or the third state to another state.

DESCRIPTION OF EXEMPLARY EMBODIMENTS

1. Configuration of Display System

An exemplary embodiment to which the present disclosure is applied is described below with reference to the drawings.

Figure 1:
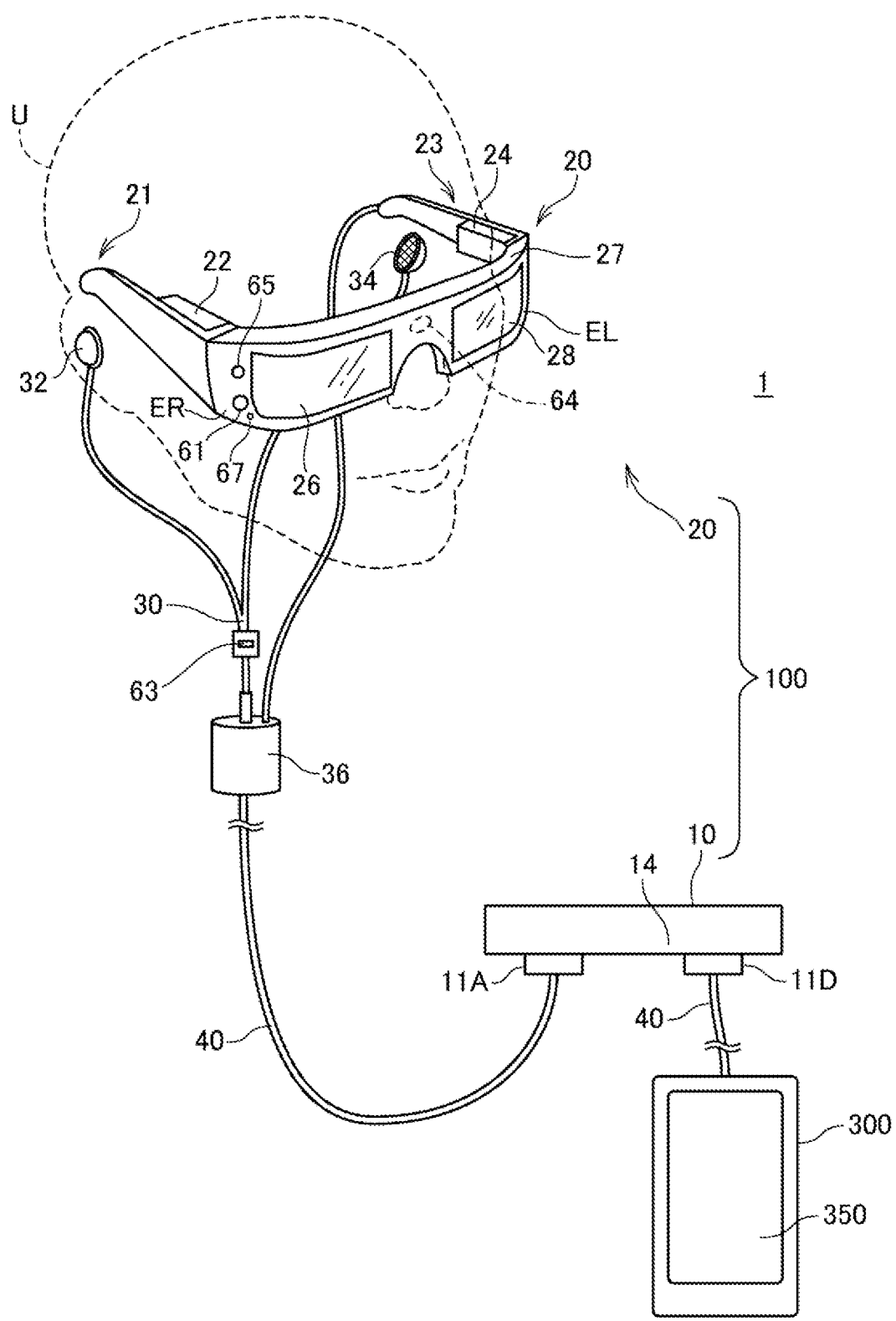
FIG. 1 is a view illustrating a schematic configuration of a display system.

FIG. 1 is a view illustrating a schematic configuration of a display system 1.

A display system 1 includes an HMD 100 and a control device 300. The HMD 100 is a head-mounted display device that includes an image display unit 20 to be mounted on a head of a user U and causes the user U to visually recognize an image and video, and is an example of a display device according to the present disclosure. HMD is an abbreviation for Head Mounted Display.

The HMD 100 includes a coupling device 10 that is coupled to the image display unit 20. The coupling device 10 functions as an interface that couples the HMD 100 to a device that is different from the HMD 100. In the display system 1, the coupling device 10 is coupled to the control device 300.

In the following description and drawings, for convenience of description, components constituting the HMD 100 are denoted with names each having a prefix DP, and components constituting the control device 300 are denoted with names each having a prefix CO.

The control device 300 is a terminal device in a portable size that includes a touch panel 350, and may be a smartphone, for example. The touch panel 350 functions as a display screen that displays characters and images and an operation unit that detects a touch operation and a pressing operation. The touch panel 350 is constituted of an LCD 331 and a touch sensor 336 that are described later with reference to FIG. 4. LCD is an abbreviation for Liquid Crystal Display. The control device 300 may be a desk top type personal computer, a laptop type personal computer, a tablet type personal computer, or the like.

The coupling device 10 includes a connector 11A and a connector 11D in a box-shaped case. The connector 11A is coupled to the image display unit 20 via a coupling cable 40, and the connector 11D is coupled to the control device 300 via a USB cable 46. With this, the image display unit 20 and the control device 300 are coupled in a such a way to transmit and receive data to/from each other. For example, the control device 300 outputs image data and sound data to the image display unit 20, and thus the image display unit 20 displays video. For example, the image display unit 20 transmits, to the control device 300, detection data of various sensors included in the image display unit 20 as described later. The control device 300 may be capable of supplying power to the image display unit 20. USB is an abbreviation for Universal Serial Bus.

The configuration of coupling the coupling device 10 and the control device 300 to each other through use of the USB cable 46 is merely an example. The specific coupling mode between the coupling device 10 and the control device 300 is not limited thereto. For example, wired coupling may be established through use of other types of cables, or coupling may be established via wireless communication. For example, in a configuration in which the USB cable 46 is coupled to the connector 11D complying with a USB-Type C standard, a direct current of 20V can be supplied from the USB cable 46. As a function in an alternate mode for USB-Type C, image data complying with an HDMI standard or the like can be transmitted. HDMI and MHL are registered trademarks.

The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from corresponding ends of the front frame 27, to hold the image display unit 20 on the head of the user U. The right holding part 21 is coupled to an end ER of the front frame 27, which is positioned on the right side of the user U, and the left holding part 23 is coupled to an end EL, which is positioned on the left side of the user U.

The right light-guiding plate 26 and the left light-guiding plate 28 are provided on the front frame 27. The right light-guiding plate 26 is positioned in front of the right eye of the user U under a state where the user wears the image display unit 20, and causes the user U to visually recognize an image with the right eye. The left light-guiding plate 28 is positioned in front of the left eye of the user U under a state where the user wears the image display unit 20, and causes the user U to visually recognize an image with the left eye. The right light-guiding plate 26 and the left light-guiding plate 28 are optical parts formed of a light transmissive resin or the like, and guide imaging light output by the right display unit 22 and the left display unit 24 to the eyes of the user U. The right light-guiding plate 26 and the left light-guiding plate 28 are, for example, prisms.

The front frame 27 has a shape formed by coupling an end of the right light-guiding plate 26 and an end of the left light-guiding plate 28 to each other, and this coupling position corresponds to a position between eyebrows of the user U under a state where the user U wears the image display unit 20. The front frame 27 may include a nose pad portion that abuts against the nose of the user U under a state where the user wears the image display unit 20, and may have a configuration in which a belt is coupled to the right holding part 21 and the left holding part 23 and the image display unit 20 is held on the head of the user U with the belt.

Each of the right display unit 22 and the left display unit 24 is a module obtained by unitizing an optical unit and a peripheral circuit. The right display unit 22 displays an image with the right light-guiding plate 26, and the left display unit 24 displays an image with the left light-guiding plate 28. The right display unit 22 is provided to the right holding part 21, and the left display unit 24 is provided to the left holding part 23.

Imaging light guided by the right light-guiding plate 26 and external light passing through the right light-guiding plate 26 enter the right eye of the user U. Similarly, the imaging light guided by the left light-guiding plate 28 and external light passing through the left light-guiding plate 28 enter the left eye. The imaging light from the right light-guiding plate 26 and the left light-guiding plate 28 and the external light passing through the right light-guiding plate 26 and the left light-guiding plate 28 enter the eyes of the user U. With this, the user U visually recognizes an image displayed by the image display unit 20 and an external scene passing through the right light-guiding plate 26 and the left light-guiding plate 28 in an overlapping manner.

A DP illuminance sensor 65 is arranged on the front frame 27. The DP illuminance sensor 65 is a sensor that receives external light coming from the front side of the user U wearing the image display unit 20. The DP illuminance sensor 65 can detect illuminance and a light amount of the external light that passes through the right light-guiding plate 26 and the left light-guiding plate 28 and enters the eyes of the user U.

A DP outer camera 61 is provided on the front frame 27 at a position at which the DP outer camera 61 does not block the external light passing through the right light-guiding plate 26 and the left light-guiding plate 28. The DP outer camera 61 is a digital camera including an image capturing element such as a CCD and a CMOS, an image capturing lens, and the like, and may be a monocular camera or a stereo camera. An angle of view of the DP outer camera 61 includes at least a part of a range of an external scene that the user U wearing the image display unit 20 visually recognizes through the right light-guiding plate 26 and the left light-guiding plate 28. The DP outer camera 61 may be a wide angle camera, and may be a camera capable of capturing an image of an entire external scene that the user U wearing the image display unit 20 visually recognizes. CCD is an abbreviation for Charge Coupled Device, and CMOS is an abbreviation for Complementary Metal Oxide Semiconductor.

An LED indicator 67 is arranged on the front frame 27. The LED indicator 67 flashes during operating the DP outer camera 61.

A distance sensor 64 is provided on the front frame 27. The distance sensor 64 detects a distance to a measurement target object positioned in a measurement direction set in advance. The distance sensor 64 is, for example, an optical reflection type distance sensor using an LED, a laser diode, or the like, an infrared ray type depth sensor, an ultrasonic type distance sensor, or a laser range scanner. The distance sensor 64 may be a distance detection unit obtained by combining an image detector and an audio detector or a device that detects a distance by processing an image obtained by stereo photographing of a camera. The measurement direction of the distance sensor 64 is, for example, a direction of an external scene that the user U visually recognizes through the right light-guiding plate 26 and the left light-guiding plate 28.

Each of the right display unit 22 and the left display unit 24 is coupled to the coupling device 10 via the coupling cable 40. The coupling cable 40 includes an audio connector 36. A headset 30 including a right earphone 32 and a left earphone 34 that constitute a stereo headphone, and a microphone 63, is coupled to the audio connector 36. The right earphone 32 and the left earphone 34 output a sound based on a sound signal output from the coupling device 10. The microphone 63 collects a sound, and outputs a sound signal to the coupling device 10.

2. Configuration of Optical System of Image Display Unit

Figure 2:
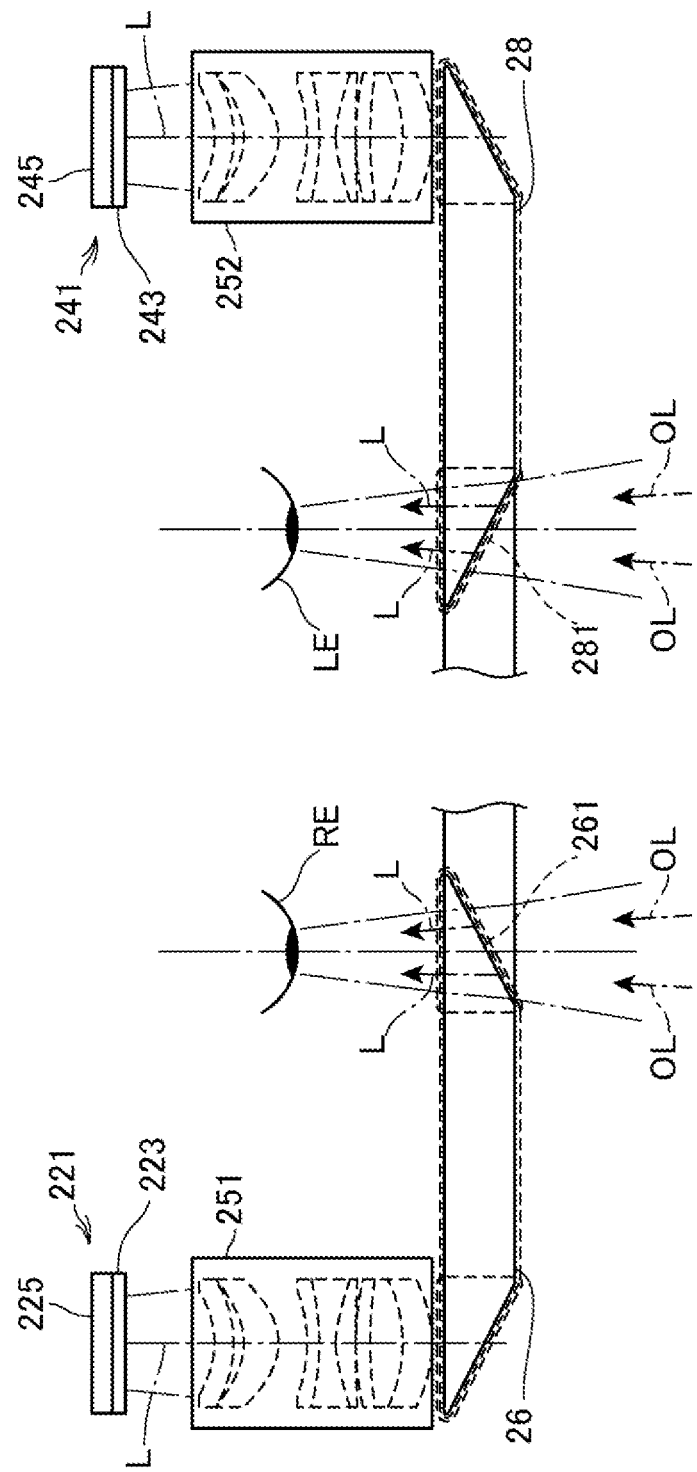
FIG. 2 is a plan view illustrating a main part of a configuration of an optical system of an image display unit.

FIG. 2 is a plan view illustrating a main part of a configuration of an optical system of the image display unit 20. In FIG. 2, a left eye LE and a right eye RE of the user U are illustrated for description.

The right display unit 22 and the left display unit 24 are configured in a left-right symmetrical manner, for example.

As a configuration that allows an image to be visually recognized with the right eye RE, the right display unit 22 includes an OLED unit 221 that emits imaging light and a right optical system 251 that guides imaging light L emitted by the OLED unit 221 to the right light-guiding plate 26. OLED is an abbreviation for Organic Light Emitting Diode.

Figure 3:
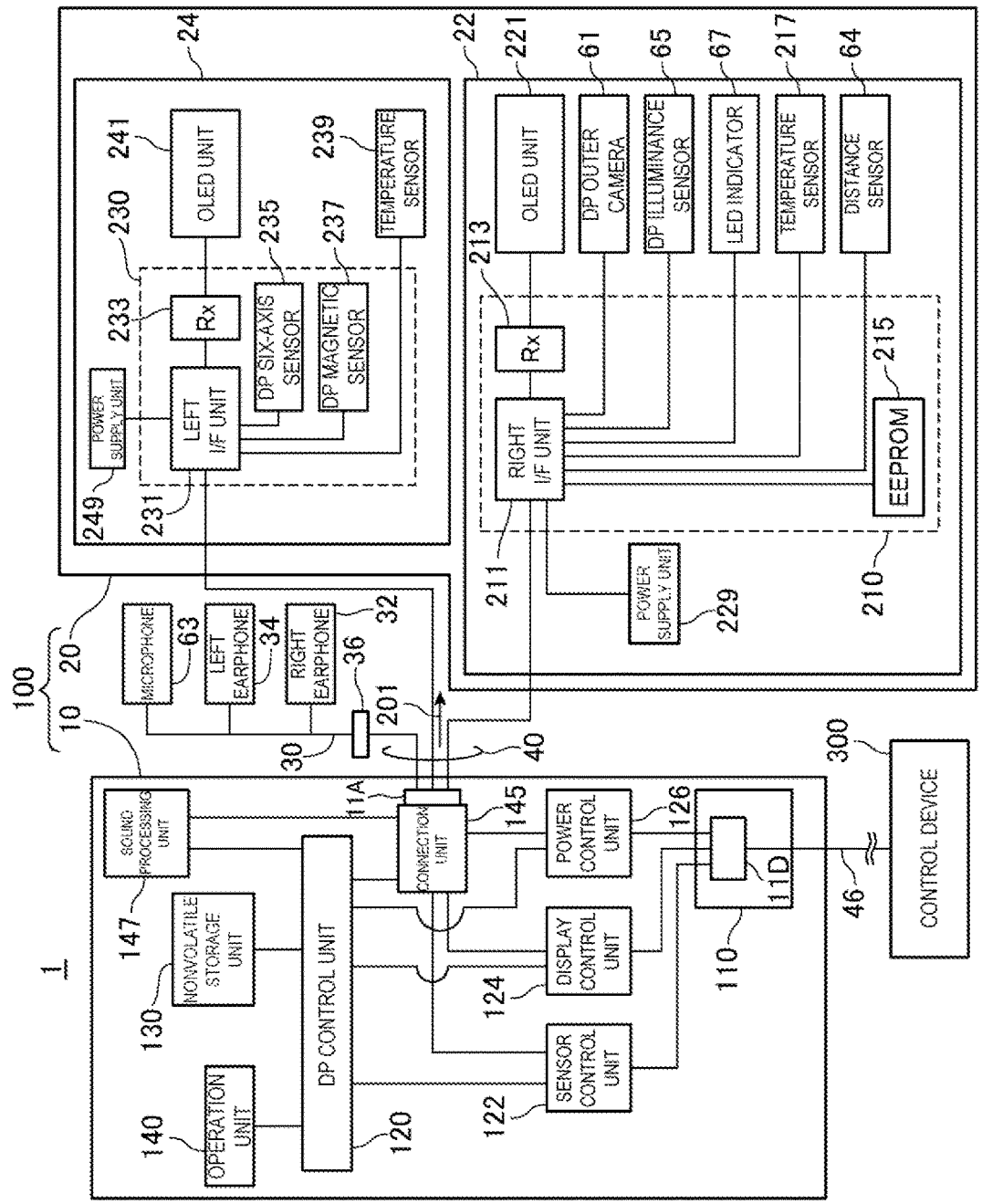
FIG. 3 is a block diagram of the display system.

The OLED unit 221 includes an OLED panel 223 and an OLED drive circuit 225 that drives the OLED panel 223. The OLED panel 223 is a self-light emission type display panel on which light-emitting elements are arranged. The light-emitting elements respectively emit colored light R, G, and B. The OLED drive circuit 225 drives the OLED panel 223 in accordance with control of a DP control unit 120. For example, the OLED drive circuit 225 is mounted on a substrate (not shown) fixed on a back surface of the OLED panel 223. A temperature sensor 217 illustrated in FIG. 3 is mounted on the substrate.

The right optical system 251 collimates the imaging light L, which is emitted from the OLED panel 223, into a parallel light flux, and causes the imaging light L to enter the right light-guiding plate 26. The imaging light L is reflected by a plurality of reflection surfaces inside the right light-guiding plate 26, is reflected by a half mirror 261 positioned in front of the right eye RE, and is emitted from the right light-guiding plate 26 toward the right eye RE.

As a configuration that allows an image to be visually recognized with the left eye LE, the left display unit 24 includes an OLED unit 241 that emits imaging light and a left optical system 252 that guides imaging light L emitted by the OLED unit 241 to the left light-guiding plate 28.

The OLED unit 241 includes an OLED panel 243, and an OLED drive circuit 245 that drives the OLED panel 243. The OLED panel 243 is a self-light emission type display panel on which light-emitting elements are arranged. The light-emitting elements respectively emit colored light R, G, and B, for example. The OLED drive circuit 245 drives the OLED panel 243 in accordance with control of the DP control unit 120. For example, the OLED drive circuit 245 is mounted on a substrate (not shown) fixed on a back surface of the OLED panel 243. A temperature sensor 239 illustrated in FIG. 3 is mounted on the substrate.

The left optical system 252 collimates the imaging light L, which is emitted from the OLED panel 243, into a parallel light flux, and causes the imaging light L to enter the left light-guiding plate 28. The imaging light L is reflected by a plurality of reflection surfaces inside the left light-guiding plate 28, is reflected by the half mirror 261 positioned in front of the left eye LE, and is emitted from the left light-guiding plate 28 toward the left eye LE.

The HMD 100 functions as a see-through type display device. Namely, the imaging light L reflected by the half mirror 261 and external light OL passing through the right light-guiding plate 26 enter the right eye RE of the user U. The imaging light L reflected by the half mirror 281 and the external light OL passing through the half mirror 281 enter the left eye LE. The HMD 100 causes the imaging light L of the internally processed image and the external light OL to enter the eyes of the user U in an overlapping manner. Thus, the user U is caused to view an external scene through the right light-guiding plate 26 and the left light-guiding plate 28, and the image formed by the imaging light L can be visually recognized in a manner overlapping with the external scene. Each of the half mirrors 261 and 281 is an image extracting part that reflects imaging light output by each of the right display unit 22 and the left display unit 24 and extracts an image, and constitutes a display unit.

3. Control System of HMD

FIG. 3 is a block diagram of the display system 1, illustrating the configuration of the HMD 100 in detail.

The right display unit 22 of the image display unit 20 includes a right display unit substrate 210. On the right display unit substrate 210, a right I/F unit 211 coupled to the coupling cable 40, a reception unit 213 that receives data input from the coupling device 10 via the right I/F unit 211, and an EEPROM 215 are mounted. The right I/F unit 211 couples the reception unit 213, the EEPROM 215, the temperature sensor 217, the DP outer camera 61, the distance sensor 64, the DP illuminance sensor 65, and the LED indicator 67 to the coupling device 10. The reception unit 213 couples the OLED unit 221 to the coupling device 10.

The left display unit 24 includes a left display unit substrate 230. On the left display unit substrate 230, a left I/F unit 231 coupled to the coupling cable 40, a reception unit 233 that receives data input from the coupling device 10 via the left I/F unit 231 are mounted. On the left display unit substrate 230, a DP six-axis sensor 235 and a DP magnetic sensor 237 are mounted.

The left I/F unit 231 couples the reception unit 233, the DP six-axis sensor 235, the DP magnetic sensor 237, and the temperature sensor 239 to the coupling device 10. The reception unit 233 couples an OLED unit 241 to the coupling device 10.

In the description of the present exemplary embodiment and the drawings, I/F is an abbreviation for interface. EEPROM is an abbreviation for Electrically Erasable Programmable Read-Only Memory. The reception unit 213 and the reception unit 233 are denoted as Rx213 and Rx233, respectively, in some cases.

The EEPROM 215 stores various types of data in a nonvolatile manner. The EEPROM 215 stores, for example, data relating to light-emitting properties and display properties of the OLED units 221 and 241 included in the image display unit 20, and data relating to a property of a sensor included in the right display unit 22 or the left display unit 24. Specifically, the EEPROM 215 stores parameters regarding gamma correction of the OLED units 221 and 241, data used to compensate for detection values of the temperature sensors 217 and 239, and the like in a readable manner with the DP control unit 120.

The DP outer camera 61 captures an image in accordance with a signal input via the right I/F unit 211 and outputs captured image data to the right I/F unit 211. The DP illuminance sensor 65 receives the external light, and outputs a detection value corresponding to an amount of the received light or an intensity of the received light. The LED indicator 67 flashes in accordance with a control signal or a driving current that is input via the right I/F unit 211.

The temperature sensor 217 detects a temperature of the OLED unit 221, and outputs a voltage value or a resistance value corresponding to the detected temperature as a detection value.

The distance sensor 64 executes distance detection, and output a signal indicating detection results to the coupling device 10 via the right I/F unit 211.

The reception unit 213 receives image data for displaying transmitted from the coupling device 10 via the right I/F unit 211, and outputs the image data to the OLED unit 221. The OLED unit 221 displays an image based on the image data transmitted from the coupling device 10.

The reception unit 233 receives image data for displaying transmitted from the coupling device 10 via the left I/F unit 231, and outputs the image data to the OLED unit 241. The OLED units 221 and 241 display an image based on the image data transmitted from the coupling device 10.

The DP six-axis sensor 235 is a motion sensor including a three-axis acceleration sensor and a three-axis gyro sensor. The DP magnetic sensor 237 is a three-axis geomagnetic sensor, for example. The DP six-axis sensor 235 and the DP magnetic sensor 237 may be an IMU in which the sensors described above are modularized, and may be a module in which the DP six-axis sensor 235 and the DP magnetic sensor 237 are integrated. IMU is an abbreviation for Inertial Measurement Unit. The temperature sensor 239 detects a temperature of the OLED unit 241. Each of the DP six-axis sensor 235, the DP magnetic sensor 237, and the temperature sensor 239 outputs a detection value to the coupling device 10.

Each component of the image display unit 20 operates with power supplied from the coupling device 10 via the coupling cable 40. The image display unit 20 includes a power supply unit 229 on the right display unit 22, and a power supply unit 249 on the left display unit 24. The power supply unit 229 distributes and supplies the power, which is supplied from the coupling device 10 via the coupling cable 40, to each part of the right display unit 22 including the right display unit substrate 210. Similarly, the power supply unit 249 distributes and supplies the power, which is supplied from the coupling device 10 via the coupling cable 40, to each part of the left display unit 24 including the left display unit substrate 230. The power supply units 229 and 249 may include a conversion circuit or the like that converts a voltage.

The coupling device 10 includes an I/F unit 110, a DP control unit 120, a sensor control unit 122, a display control unit 124, a power control unit 126, a nonvolatile storage unit 130, an operation unit 140, a coupling unit 145, and a sound processing unit 147.

Further, the I/F unit 110 includes the connector 11D and interface circuits that execute communication protocols, which conform to respective communication standards, with the connector 11D. The I/F unit 110 may be, for example, an interface substrate on which the connectors 11D and the interface circuits are mounted. For example, the I/F unit 110 may include an interface for a memory card capable of being coupled to an external storage device or storage medium, or the like, or the I/F unit 110 may include a radio communication interface.

The DP control unit 120 includes a processor such as a CPU or a microcomputer, and this processor executes a program to control each component of the coupling device 10. The DP control unit 120 may include a RAM that prepares a work area for the processor. RAM is an abbreviation for Random Access Memory.

The DP control unit 120 is coupled to the nonvolatile storage unit 130, the operation unit 140, the coupling unit 145, and the sound processing unit 147. The nonvolatile storage unit 130 is a ROM that stores a program and data to be executed by the DP control unit 120, in a nonvolatile manner. ROM is an abbreviation for Read Only Memory.

The sensor control unit 122 operates each of the sensors included in the image display unit 20. Here, the sensors indicate the DP outer camera 61, the distance sensor 64, the DP illuminance sensor 65, the temperature sensor 217, the DP six-axis sensor 235, the DP magnetic sensor 237, and the temperature sensor 239. The sensors include at least one or more sensors among the DP outer camera 61, the DP illuminance sensor 65, the DP six-axis sensor 235, and the DP magnetic sensor 237. Specifically, the sensor control unit 122 performs setting and initialization of a sampling period of each sensor in accordance with control of the DP control unit 120, and executes energization to each sensor, transmission of control data, acquisition of detection values and the like, in correspondence to the sampling period of each sensor.

The sensor control unit 122 outputs detection data indicating detection values and detection results of the sensors to the I/F unit 110 at a timing set in advance. Here, the captured image data of the DP outer camera 61 is referred to as detection data, similarly to detection values and detection results of the other sensors.

The sensor control unit 122 may include an A/D converter that converts an analog signal to digital data. In this case, the sensor control unit 122 converts an analog signal indicating detection values and detection results, which are acquired from the sensors of the image display unit 20, to detection data, and outputs the detection data. The sensor control unit 122 may acquire digital data indicating detection values and detection results obtained from the sensors of the image display unit 20, perform conversion of a data format and adjustment of an output timing, and output the detection data to the I/F unit 110.

An operation of the sensor control unit 122 enables the control device 300, which is coupled to the I/F unit 110, to acquire detection values of the sensors of the HMD 100 and captured image data of the DP outer camera 61.

The sensor control unit 122 may output resultants obtained by subjecting the detection values of the sensors described above to an arithmetic operation, as detection data. For example, the sensor control unit 122 may integrally processes detection values of a plurality of sensors and detection results, and may function as a so-called sensor fusion processing unit. In this case, through sensor fusion, the sensor control unit 122 may generate detection data of a virtual sensor that is not included in the sensors of the image display unit 20. For example, the sensor control unit 122 may output track data indicating a movement track of the image display unit 20, coordinate data indicating a three-dimensional position of the image display unit 20, and direction data indicating a direction of the image display unit 20, as detection data. Here, the coordinate data may be data indicating a relative coordinate with a position of the coupling device 10 as a reference, or may be data indicating a position with respect to a reference position set in a space in which the image display unit 20 is present. The direction data may be data indicating a direction with a position or a direction of the coupling device 10 as a reference, or may be data indicating a direction with respect to a reference position set in a space in which the image display unit 20 is present.

The sensor control unit 122 executes a communication protocol with a device coupled to the connector 11D via the USB cable 46, and outputs detection data.

The display control unit 124 executes various kinds of processing for the image display unit 20 to display an image based on image data input to the I/F unit 110 and/or display control data. The display data includes image data, for example. In the present exemplary embodiment, image data is transmitted in an alternate mode for USB-Type C via the connector 11D constituted of a USB-Type C connector. For example, the display control unit 124 executes various kinds of processing such as cutting out of a frame, resolution conversion, scaling, intermediate frame generation, and frame rate conversion. The display control unit 124 outputs image data corresponding to the OLED units 221 and 241, to the coupling unit 145. The image data input to the coupling unit 145 is transmitted as an image signal 201 from the connector 11A to the right I/F unit 211 and the left I/F unit 231. The display control unit 124 corresponds to an example of a first display control unit of the present disclosure, and displays an image on the right display unit 22 and the left display unit 24 in accordance with image data transmitted from the control device 300. The display control unit 124 adjusts and changes a display state of the image display unit 20 in accordance with display control data input to the I/F unit 110.

The sensor control unit 122 and/or the display control unit 124 may be realized by cooperation of software and hardware by a processor executing a program. That is, the sensor control unit 122 and the display control unit 124 are constituted of a processor executing a program, and the operations described above are executed. In this example, the sensor control unit 122 and the display control unit 124 may be realized by a processor constituting the DP control unit 120 executing a program. In other words, the processor may function as the DP control unit 120, the display control unit 124, and the sensor control unit 122 by executing the program. Here, the processor can be reworded to a computer. Each of the sensor control unit 122 and the display control unit 124 may include a work memory for executing data processing, and may execute processing by using a memory of the DP control unit 120.

The display control unit 124 and the sensor control unit 122 may include programmed hardware such as DSP and FPGA. The sensor control unit 122 and the display control unit 124 may be integrated to be configured of an SoC-FPGA. DSP is an abbreviation for Digital Signal Processor, FPGA is an abbreviation for Field Programmable Gate Array, and SoC is an abbreviation for System-on-a-Chip.

The power control unit 126 is a circuit that is coupled to the connector 11D and supplies power to each component of the coupling device 10 and to the image display unit 20, based on power supplied from the connector 11D.

The operation unit 140 detects an operation on a switch or the like included in the coupling device 10, and outputs data indicating an operation content to the DP control unit 120.

The sound processing unit 147 generates a sound signal in accordance with sound data input from the DP control unit 120, and outputs the sound signal to the coupling unit 145. This sound signal is output from the coupling unit 145 to the right earphone 32 and the left earphone 34 via the audio connector 36. Additionally, the sound processing unit 147 generates sound data of a sound collected by the microphone 63, and outputs the sound data to the DP control unit 120. The sound data output from the sound processing unit 147 may be processed by the sensor control unit 122, similarly to detection data of the sensors included in the image display unit 20.

4. Configuration of Control Device

Figure 4:
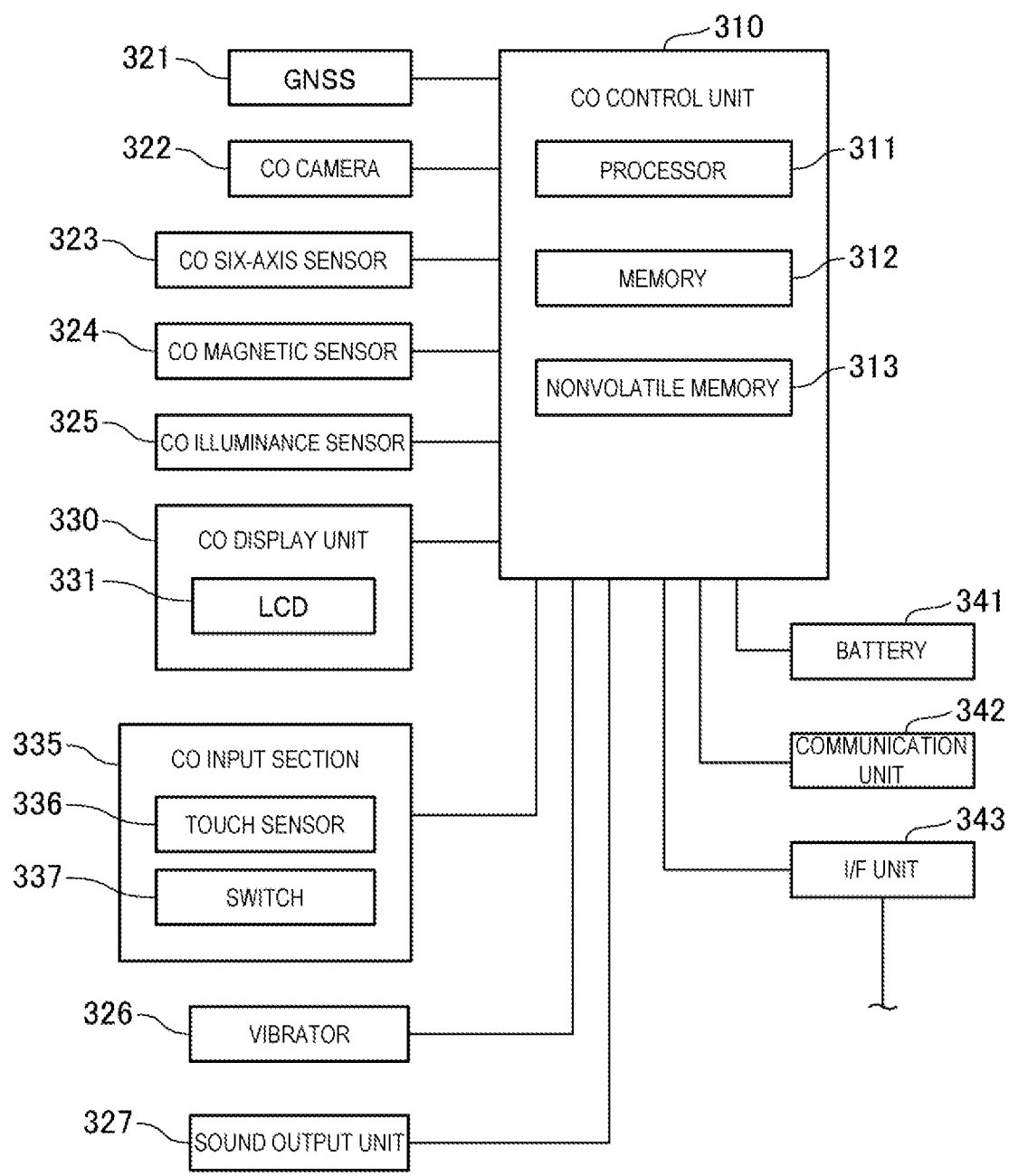
FIG. 4 is a block diagram of a control device.

FIG. 4 is a block diagram of the control device 300.

The control device 300 includes a CO control unit 310. The CO control unit 310 includes a processor 311, a memory 312, and a nonvolatile memory 313. The processor 311 is constituted of a CPU, a microcomputer, a DSP or the like, and executes a program to control each unit of the control device 300. The memory 312 forms a work area of the processor 311. The nonvolatile memory 313 is constituted of a semiconductor memory device or the like, and stores a program executed by the processor 311 and various types of data processed by the processor 311 in a nonvolatile manner. For example, the nonvolatile memory 313 stores an operating system as a basic control program executed by the processor 311, an application program operated on the operating system, and the like. The nonvolatile memory 313 stores data processed during execution of the application program, data of processing results, and the like. The operating system is referred to as OS as an abbreviation.

The CO control unit 310 may be a SoC obtained by integrating the processor 311, the memory 312, and the nonvolatile memory 313.

The CO control unit 310 is coupled to a GNSS 321, a CO camera 322, a CO six-axis sensor 323, a CO magnetic sensor 324, a CO illuminance sensor 325, a vibrator 326, a sound output unit 327, a CO display unit 330, and a CO input unit 335.

The GNSS 321 performs positioning through use of a satellite positioning system, and outputs a position of the control device 300 to the CO control unit 310. GNSS is an abbreviation for Global Navigation Satellite System.

The CO camera 322 is a digital camera provided to the main body of the control device 300, is arranged adjacent to, for example, the touch panel 350, and captures an image in a direction facing the touch panel 350. The CO camera 322 captures an image in accordance with control of the CO control unit 310, and outputs captured image data to the CO control unit 310.

The CO six-axis sensor 323 is a motion sensor including a three-axis acceleration sensor and a three-axis gyro sensor, and outputs detection data indicating detection values to the Co control unit 310. The CO magnetic sensor 324 is, for example, a three-axis geomagnetic sensor, and outputs detection data indicating detection values to the CO control unit 310. The CO six-axis sensor 323 and the CO magnetic sensor 324 may be an IMU in which the sensors described above are modularized, and may be a module in which the CO six-axis sensor 323 and the CO magnetic sensor 324 are integrated.

The CO illuminance sensor 325 receives the external light, and outputs detection data indicating a detection value corresponding to an amount of the received light or an intensity of the received light to the CO control unit 310.

The vibrator 326 generates vibration in accordance with control of the CO control unit 310, and causes a part or an entirety of the main body of the control device 300 to vibrate. The vibrator 326 includes an eccentric weight and a motor, for example.

The sound output unit 327 includes a speaker, and outputs a sound from the speaker in accordance with control of the CO control unit 310. The sound output unit 327 may include an amplifier that amplifies a sound signal output from the CO control unit 310 and outputs the sound signal to the speaker. When the CO control unit 310 has a configuration of outputting digital sound data, the sound output unit 327 may include a D/A converter that coverts digital sound data to an analog sound signal.

The CO display unit 330 includes the LCD 331, and causes a character or an image to be displayed on the LCD 331 in accordance with control of the CO control unit 310.

The CO input unit 335 detects an operation on the touch sensor 336 and a switch 337, and outputs operation data indicating the detected operation to the CO control unit 310. The touch sensor 336 is arranged on the surface of the LCD 331 in an overlapping manner, and constitutes the touch panel 350 together with the LCD 331. The touch sensor 336 detects a contact operation or a pressing operation by the user U. For example, the switch 337 is a hardware switch such as a power supply switch of the control device 300, a sound volume adjustment switch, and the like. The switch 337 may be a contact sensor or a noncontact sensor, and may be a fingerprint sensor embedded in the touch panel 350, for example. The switch 337 corresponds to an example of an operation element of the present disclosure. The CO input unit 335 corresponds to an example of an operation unit of the present disclosure. Further, the switch 337 may be a software switch formed by using a part or an entirety of the touch sensor 336.

The CO control unit 310 is coupled to a battery 341, a communication unit 342, and an I/F unit 343.

The battery 341 is a secondary battery embedded in the main body of the control device 300, and supplies power to each unit of the control device 300. The battery 341 may include a control circuit (not shown) that controls output of power or charging of the secondary battery.

The communication unit 342 corresponds to a wireless communication protocol such as Bluetooth and Wi-Fi, and executes wireless communication with an external device in the display system 1. Bluetooth and Wi-Fi are registered trademarks. The communication unit 342 may have a configuration of executing mobile data communication through use of a mobile communication network such as LTE and the fifth generation mobile communication system. LTE is a registered trademark.

Further, the I/F unit 343 includes a connector (not shown) coupled to a data communication cable, and interface circuits that execute communication protocols, which conform to respective communication standards, with the connector. For example, the I/F unit 343 includes a connector conforming to the USB standard and interface circuits, and transmits and receives data via the USB cable 46.

In the present exemplary embodiment, the control device 300 transmits image data to the HMD 100 via the I/F unit 343, and receives detection data of the sensors from the HMD 100. The control device 300 supplies power to the HMD 100 via the I/F unit 343.

The I/F unit 343 of the present exemplary embodiment includes a USB interface. A configuration in which the control device 300 transmits and receives data to/from the HMD 100 through use of the USB cable 46 coupled to the I/F unit 343 is given as a configuration.

For example, the control device 300 may execute wireless data communication with the HMD 100 through use of the communication unit 342.

5. Configuration of Software Platform

Figure 5:
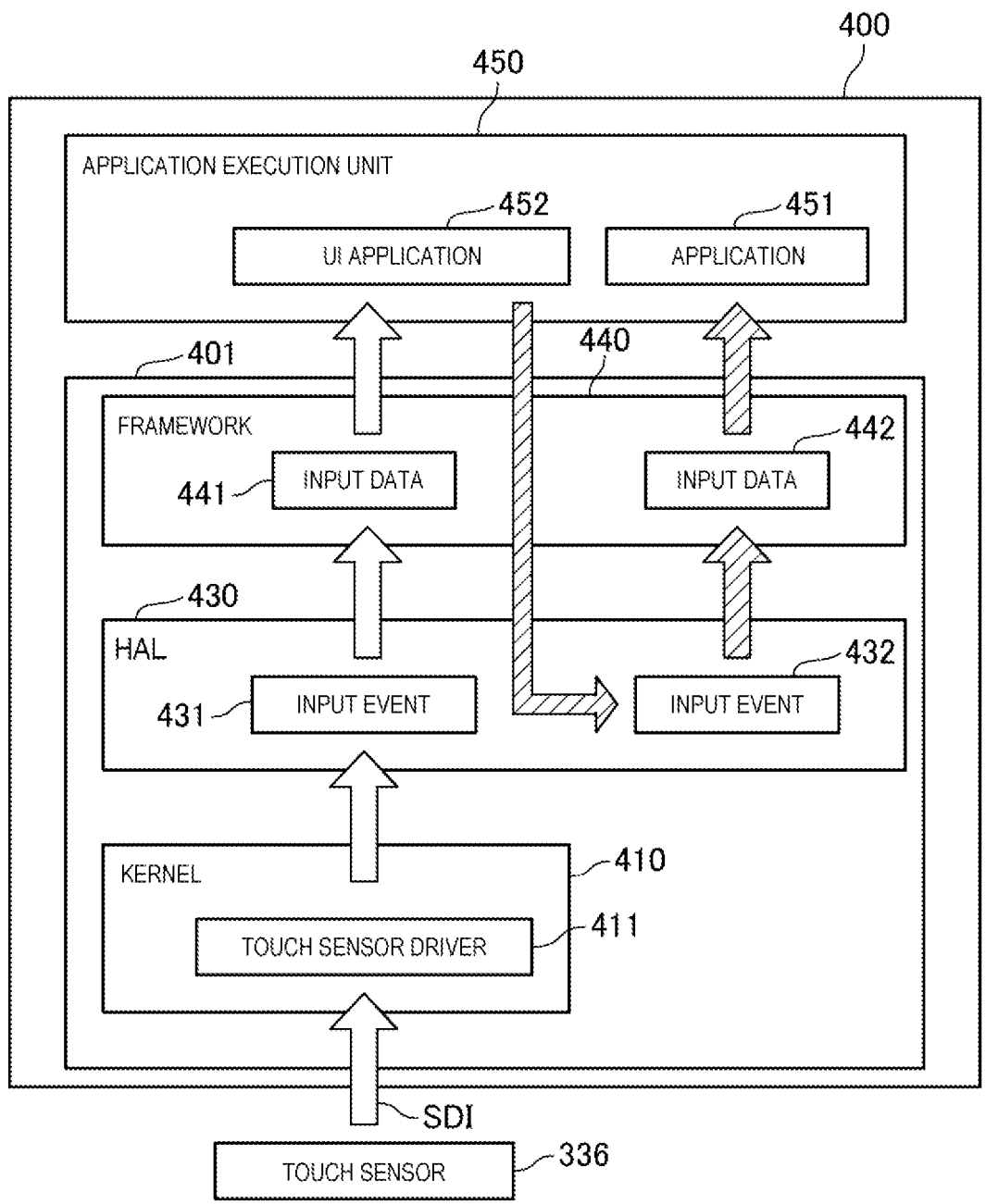
FIG. 5 is a schematic view illustrating a configuration of a software platform of the control device.

FIG. 5 is a schematic view illustrating a configuration of a software platform of the control device 300. In the control device 300, the processor 311 executes an operating system to realize a platform 400 that operates an application software by cooperation of hardware and software.

The operating system executed by the processor 311 is constituted of a group of files including an execution file of a program executed by the processor 311, a data file processed with the program, and the like. As the operating system of the control device 300, general purpose operating systems such as Android, iOS, iPad OS, Windows, Mac OS, Linux, Unix, and Tron are given as examples. The operating system executed by the processor 311 may be obtained by modulating part of any one of the general purpose operating systems described above. Android, iOS, iPad, Windows, Linux, Unix, and Tron are registered trademarks. Mac is a trademark.

The platform 400 includes a number of function modules. FIG. 5 illustrates parts of the function modules of the platform 400. The platform 400 is capable of controlling various sensors such as the CO camera 322, the CO six-axis sensor 323, the CO magnetic sensor 324, and the CO illuminance sensor 325 included in the control device 300 and the sensors included in the HMD 100. As an example, FIG. 5 illustrates a configuration of acquiring detection data of the touch sensor 336 and detecting an operation on the touch panel 350.

The platform 400 includes a kernel 410, an HAL 430, a framework 440, and an application execution unit 450. The kernel 410, the HAL 430, and the framework 440 are realized by the functions of the operating system executed by the processor 311. The operating system includes one or a plurality of programs, data, a library, a runtime module, and the like, and the processor 311 executes or processes those. With this, the processor 311 functions as the kernel 410, the HAL 430, and the framework 440. The application execution unit 450 is configured by the processor 311 executing the operating system. The application execution unit 450 indicates a function that the processor 311 executes an application 451 through use of an execution environment provided by the platform 400. That is, a hardware core constituting the application execution unit 450 is the processor 311, and the same holds true to the kernel 410, the HAL 430, and the framework 440.

The kernel 410 is a function unit that realizes basic functions of the platform 400. The kernel 410 includes a driver that controls the hardware of the control device 300. The driver included in the kernel 410 corresponds to each type of hardware, for example.

As an example, in a case of the platform 400 of Android OS, the kernel 410 is constituted of a Linux kernel. The framework 440 corresponds to a Java framework, and may be realized through use of an Android runtime module and a native library. Java is a registered trademark.

In example illustrated in FIG. 5, the kernel 410 includes a touch sensor driver 411 as a driver that controls external hardware of the control device 300. The touch sensor driver 411 is a driver that controls the touch sensor 336, detects a touch operation or a pressing operation on the touch sensor 336, and acquires data indicating an operation position.

Figure 6:
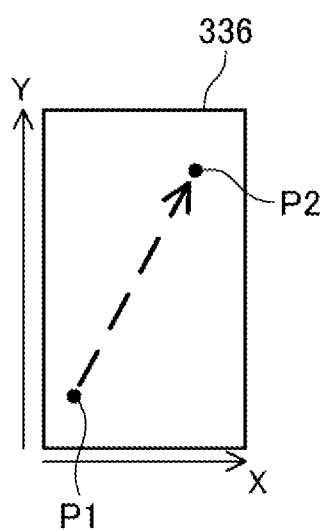
FIG. 6 is an explanatory view of a detection method for an operation on a touch sensor.

FIG. 6 is an explanatory view of a detection method for an operation on the touch sensor 336. The touch sensor 336 has a rectangular detection region, for example. For example, in the detection region of the touch sensor 336, X-Y rectangular coordinates constituted of an X-axis and a Y-axis are set as illustrated in FIG. 6. The touch sensor driver 411 acquires a detection signal SD1 being an analog signal output from the touch sensor 336, and generates detection data SD2 including an X coordinate and a Y coordinate of a position at which an operation is performed in the detection region of the touch sensor 336. The touch sensor 336 may be a sensor unit including a peripheral circuit that generates digital data. In this case, the touch sensor 336 does not output the detection signal SD1, but outputs detection data SD2 including an X coordinate and a Y coordinate of an operation position. The touch sensor driver 411 acquires the detection data SD2 output from the touch sensor 336.

A sensor data providing unit 401 outputs an operation position on the touch sensor 336 in two modes including an absolute coordinate and a relative coordinate. The absolute coordinate is a mode in which the application execution unit 450 is provided with an X-axis coordinate and a Y-axis coordinate of an operation position as data indicating the operation position. For example, as illustrated in FIG. 6, when a contact position is shifted from a position P1 to a position P2, an X-axis coordinate and a Y-axis coordinate at each position from the position P1 to the position P2 is output as an absolute coordinate. In contrast, the relative coordinate is a mode in which a relative positional relationship of a plurality of operation positions detected by the touch sensor 336 is output. In the example of FIG. 6, a difference between coordinates of the position P2 and the position P1, or a direction and a distance from the position P1 to the position P2 are output.

The touch sensor driver 411 performs processing of acquiring an operation position on the touch sensor 336 for each detection timing in a sampling period set in advance. The touch sensor driver 411 acquires a coordinate of an operation position on the touch sensor 336 at a detection timing. Therefore, the detection signal SD1 or detection data output in place of the detection signal SD1 corresponds to an X-axis coordinate and a Y-axis coordinate being absolute coordinates of an operation position.

The HAL 430 and the framework 440 function in such a way that the data subjected to processing by the kernel 410 is transmitted to the application execution unit 450. HAL is an abbreviation for Hardware Abstraction Layer.

The HAL 430 inputs and outputs data relating to hardware control with the kernel 410. The HAL 430 requests control of hardware with respect to the kernel 410, and acquires the data acquired by the kernel 410. FIG. 5 illustrates an input event 431 included in the HAL 430 as an example. The input event 431 is an event in which the kernel 410 issues a notification to the HAL 430 every time when the touch sensor driver 411 acquires the detection signal SD1 of the touch sensor 336. The input event 431 includes the detection data acquired by the touch sensor driver 411.

In the present exemplary embodiment, the HAL 430 operates in a higher rank layer of the kernel 410 as illustrated in FIG. 5. However, when the function of the sensor data providing unit 401 does not differ with respect to the application execution unit 450, a different configuration may be adopted in accordance with specifications of the operating system. For example, the HAL 430 may be implemented as middleware that operates between hardware and the kernel 410. In this case, the HAL 430 controls hardware, and transmits detection data acquired from the hardware to the kernel 410.

The framework 440 retains the detection data of the input event 431 as input data 441. The input data 441 is detection data acquired by the touch sensor driver 411 from the touch sensor 336 or data obtained by processing the detection data. In the present exemplary embodiment, the input data 441 includes coordinate data of an absolute coordinate at an operation position on the touch sensor 336.

In the platform 400, the kernel 410, the HAL 430, and the framework 440 function as the sensor data providing unit 401 that provides the application 451 with the input data 441 and input data 442 described later. The sensor data providing unit 401 is only required to be capable of providing the input data 441 and 442 to the application execution unit 450, and the illustrated architecture is merely an example. The input data 441 and 442 may also be referred to as detection data.

The application execution unit 450 executes application programs installed in the control device 300. FIG. 5 illustrates the application 451 and a UI application 452 as examples of the applications. UI is an abbreviation for User Interface.

The number and types of applications executed by the application execution unit 450 are not limited. For example, the application execution unit 450 may execute, as basic functions of the control device 300, applications realizing functions such as a calendar, a clock, an alarm, a calculator, a telephone call, messaging, e-mail, photographing with a camera, and picture management.

The application 451 is an application that performs processing based on an operation position on the touch sensor 336. For example, the application 451 realizes a function of displaying a character or an image with the image display unit 20. In this case, the CO control unit 310 executes the application 451, and thus generates display data to be displayed by the image display unit 20. The I/F unit 343 outputs the display data to the HMD 100. The CO control unit 310 executes the application 451, and generates the display control data for controlling display on the image display unit 20. The I/F unit 343 outputs the display control data to the HMD 100. The display data may be image data or video data, and is, for example, video data in an HDMI format. The display data may be still image data, and may be data containing characters and symbols. For example, the display control data is control data for setting display luminance and contrast for the image display unit 20. The CO control unit 310 corresponds to an example of a second control unit.

The HMD 100 displays an image, a video, or a character on the image display unit 20, based on the display data output from the control device 300.

The HMD 100 adjusts and changes a display state of the image display unit 20 in accordance with the display control data output from the control device 300.

The kernel 410 is capable of operating drivers that acquire detection data of various sensors other than the touch sensor driver 411, and each of those drives notifies an event to the HAL 430. Notification of an event, which is issued by each driver, is not limited by a timing of an operation of the touch sensor driver 411, and can be executed simultaneously, for example. Similarly, the number of events notified to the HAL 430 is not limited, and the number of pieces of data and the types pf data retained by the framework 440 are not limited, either.

As described above, the application execution unit 450 is provided with the input data 441 and 442. The application execution unit 450 may request any of the input data 441 and 442 from the framework 440. In accordance with this request, the input data 441 or the input data 442 is provided. An application operated by the application execution unit 450 may refer to the input data 441 and 442.

As an example, it is assumed that the application 451 uses data indicating a relative coordinate relating to an operation of the touch sensor 336 and data indicating an operation unique to a graphical interface displayed on the touch panel 350. The platform 400 of the present exemplary embodiment has a function of providing the application 451 with various types of input data generated based on the detection data acquired by the touch sensor driver 411.

The UI application 452 is an application constituting a graphical user interface of the control device 300. An image for input is displayed on the touch panel 350, and input data corresponding to an image for input is generated based on an operation position on the touch panel 350 and the image for input.

Specifically, the UI application 452 is an application has an authority to access to the sensor data providing unit 401, and functions as, for example, a plug-in to the operating system of the control device 300. The UI application 452 has a function of notifying an input event 432 to the HAL 430. The input event 432 is an event that includes input data generated by the UI application 452 and indicates an input operation different from a touch operation on the touch sensor 336.

The UI application 452 notifies the input event 432, and thus the HAL 430 transmits the input data 442 based on the input event 432 to the framework 440. The input data 442 is data indicating an input operation corresponding to the input event 432. With this, the input data 442 is provided from the framework 440 to the application 451.

The input data 442 may be data of absolute coordinates based on the X-axis and the Y-axis. For example, the input data 442 may be data indicating coordinates with the X-axis and Y-axis as references, which are coordinate axes in directions different from those in the input data 441.

Orientation of the control device 300 when the user U holds the control device 300 in a hand is not always at a basic position. Thus, the CO control unit 310 may determine orientation of the control device 300 through use of the detection data obtained by the CO six-axis sensor 323 and the CO magnetic sensor 324, and may rotate display on the LCD 331 correspondingly to the orientation of the control device 300. In this case, the CO control unit 310 changes an X-axis coordinate and a Y-axis coordinate of the touch sensor 336 on appearance in accordance with the orientation of the control device 300.

Figure 7:
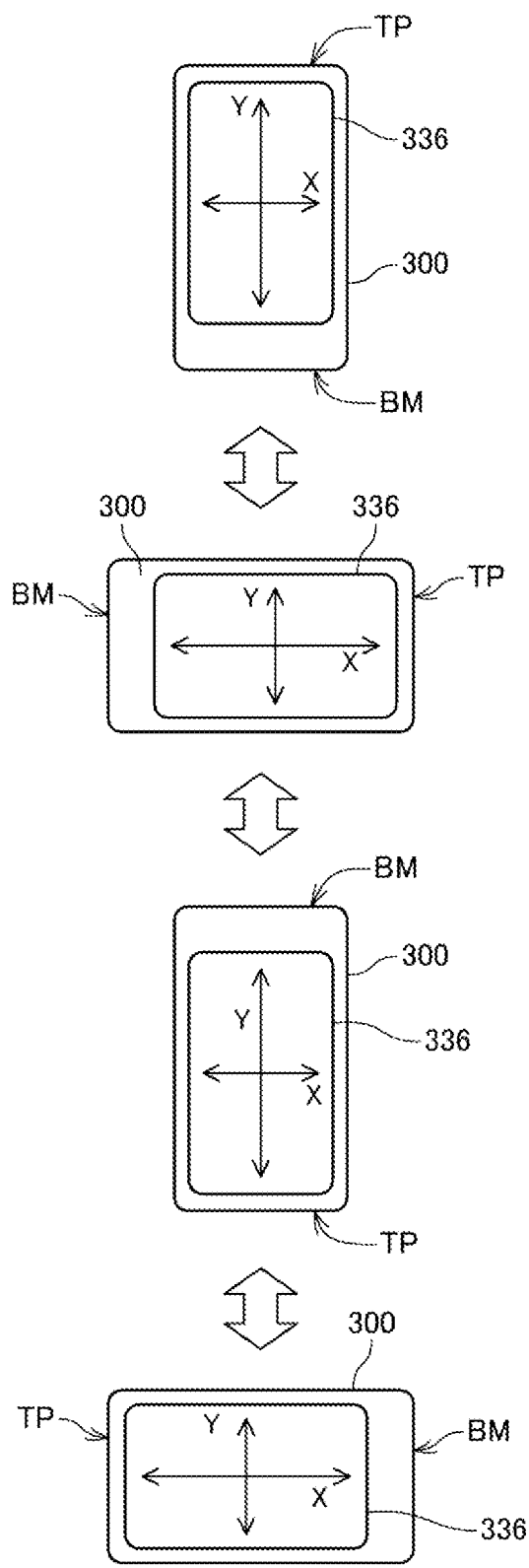
FIG. 7 is a schematic view illustrating an example of correspondence between an orientation of the control device and a detection direction of an operation.

FIG. 7 is a schematic view illustrating an example of correspondence between the orientation of the control device 300 and a detection direction of an operation. In FIG. 7, an upper end of the control device 300 at the basic position is indicated with a reference symbol TP, and a lower end thereof is indicated with a reference symbol BM.

The UI application 452 determines the orientation of the control device 300 based on the detection data obtained by the CO six-axis sensor 323 and the CO magnetic sensor 324, and changes the display direction of the LCD 331 and the X-axis and the Y-axis of the detection coordinates of the touch sensor 336 by 90 degrees. For example, as illustrated in FIG. 7, when the control device 300 is rotated to have the upper end TP at each of upper, right, lower, and left positions, the rotation is performed to have the Y-axis oriented along an up-and-down direction, that is, a vertical direction in reality.

The X-axis and Y-axis directions of the touch sensor 336 are set in a fixed manner with respect to the hardware. Thus, processing to converting the X-axis and the Y-axis of the detection coordinate of the touch sensor 336 in accordance with the orientation of the control device 300 is executed. This processing is executed by, for example, the UI application 452.

The UI application 452 acquires the detection data obtained by the CO six-axis sensor 323 and the CO magnetic sensor 324, and determines the orientation of the control device 300. The UI application 452 converts the input data 441 in accordance with the orientation of the control device 300, and generates the input data 442 indicating the absolute coordinate with the changed X-axis and Y-axis directions as references. As described above, the purpose of the UI application 452 are not limited to a purpose of converting the data indicating the absolute coordinate to other types of data. For example, the UI application 452 can be used for processing of converting the coordinate axes in the input data 441 indicating the absolute coordinate, which is provided by the sensor data providing unit 401.

The types and contents of the input data 442 differ in accordance with a user interface executed by the UI application 452. Now, the user interface realized by the UI application 452 in the control device 300 is described below.

6. Display Mode of Display System

FIG. 8, FIG. 9, FIG. 10, FIG. 11, and FIG. 12 are schematic views illustrating examples of display modes of the display system 1.

In FIG. 8, FIG. 9, FIG. 10, and FIG. 12, display on the image display unit 20 and display on the control device 300 are illustrated in association with each other. It can be described that the image display unit 20 displays two images in such a way for each of the right display unit 22 and the left display unit 24 to display an image. However, an operation is performed in such a way for the user U to visually recognize one image. Thus, in each figure, the image display unit 20 is illustrated as one display unit 205, and an image that the image display unit 20 causes the user U to visually recognize is illustrated as one rectangular image. Various screens and display objects displayed on the display unit 205 are displayed in accordance with display data output from the control device 300 to the HMD 100. Thus, the display modes of the display system 1 are realized in accordance with control of the control device 300. The image display unit 20 and the display unit 205 correspond to examples of the first display unit. The LCD 331 and the touch panel 350 correspond to examples of the second display unit.

Figure 8:
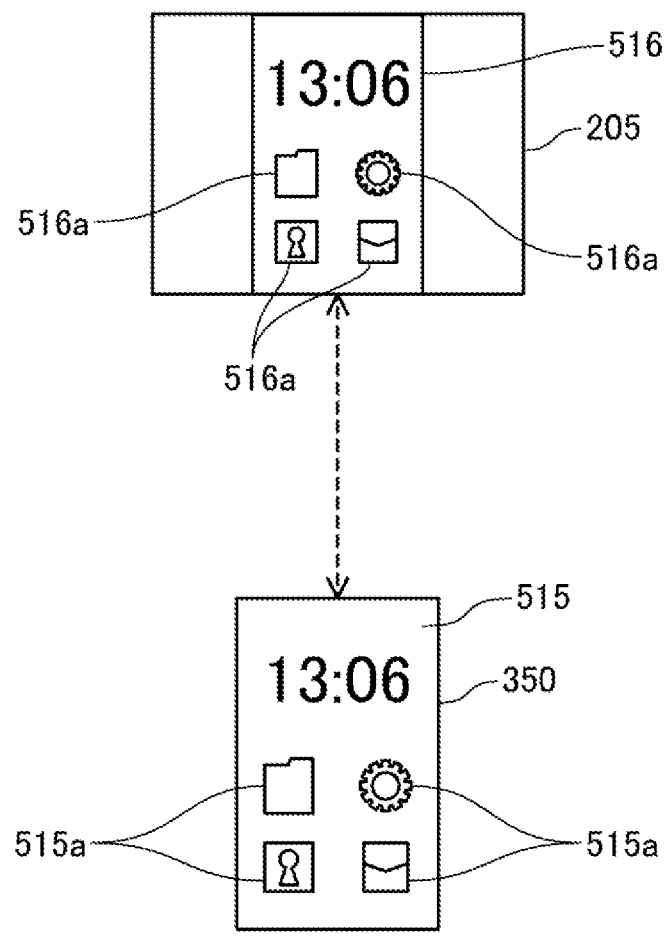
FIG. 8 is a schematic view illustrating an example of a display mode of the display system.

FIG. 8 illustrates a mirroring mode as an example of the display modes of the display system 1. The mirroring mode is a display mode in which the control device 300 and the image display unit 20 display the identical image. FIG. 8 illustrates an example of displaying home screens 515 and 516 in the mirroring mode. The home screen 515 is a screen displayed under a basic state during operating the control device 300. Objects 515a being operation targets are displayed on the home screen 515. The objects 515a are icons that respectively correspond to the applications 451 installed in the control device 300. When a touch operation is performed at a position of an object 515a, the application 451 corresponding to the object 515a is executed.

A function of displaying the home screen 515 and a function of activating the application 451 in accordance with an operation with respect to the object 515a are provided by the application 451 for the home screen, for example.

In the mirroring mode, the control device 300 generates display data for displaying an image common to an image displayed on the touch panel 350, and outputs the display image to the HMD 100. In the mirroring mode illustrated in FIG. 8, the home screen 515 is displayed on the touch panel 350, and the home screen 516 identical to the home screen 515 is displayed on the display unit 205. Aspect ratios of the touch panel 350 and the display unit 205 are different from each other. However, in the mirroring mode, the home screen 516 is displayed on the display unit 205 with the same aspect ratio as that of the touch panel 350. Resolutions of the home screen 515 and the home screen 516 may not completely be the same.

Objects 516a common to the objects 515a of the home screen 515 are arranged on the home screen 516.

In the mirroring mode, the sensor data providing unit 401 provides the input data 442 indicating a relationship between an operation position on the touch panel 350 and an operation position of the object 515a. For example, when the operation position overlaps any one of the objects 515a, the UI application 452 generates the input data 442 indicating an operation with respect to the object 515a. In this case, the input data 442 is data for specifying the operated object 515a. The input data 442 may include data indicating an operation mode with respect to the objects 515a. The operation mode indicates one touch, a plurality of subsequent touches, a touch for a time period longer than a reference, a pressing operation with a pressure exceeding a reference force, or the like.

The application 451 for displaying the home screen 515 may detect the operation with respect to the object 515a through use of the input data 441 indicating the absolute position of the operation position on the touch panel 350.

When the application 451 for displaying the home screen 515 corresponds to the input data 442, the application 451 is capable of specifying the operated object 515a easily with reference to the input data 442. Thus, activation or the like of the application 451 corresponding to the operated object 515a can be performed.

Figure 9:
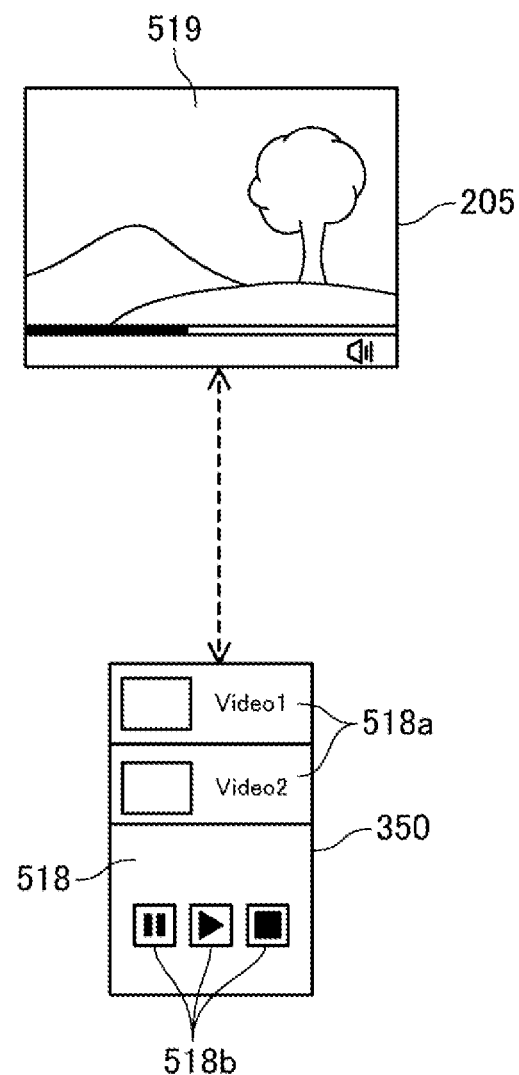
FIG. 9 is a schematic view illustrating an example of a display mode of the display system.

As an example of the display modes of the display system 1, FIG. 9 illustrates an expanded screen mode in which display on the display unit 205 and display on the touch panel 350 are different from each other. The expanded screen mode is a display mode for using a large display region obtained by expanding the display unit 205 through auxiliary use of the touch panel 350 as a display region in addition to the display unit 205. In the expanded screen mode, the display on the display unit 205 and the display on the touch panel 350 are different from each other. For example, the display unit 205 is a main display region, and the touch panel 350 is an auxiliary display region.

In the example of FIG. 9, the control device 300 executes the application 451 for reproducing a moving image. With the function of the application 451 for reproducing a movie image, the control device 300 displays an operation screen 518 for an operation of reproducing a moving image on the touch panel 350, and displays a reproduction screen 519 for displaying a moving image on the display unit 205. Moving image list items 518a and operation objects 518b are arranged on the operation screen 518. The moving image list items 518a are displayed as a list including moving images to be reproduced, the list from which the moving images can be selected with an operation. The operation objects 518b are for instructions of reproducing, stopping, and pausing. Meanwhile, a moving image being reproduced and indicators indicating a reproduction position and a volume are arranged on the reproduction screen 519. During displaying the operation screen 518, in accordance with an operation on the touch panel 350, the input data 442 based on the operation position and the display positions of the moving image list items 518a and the operation objects 518b is provided.

In the example of FIG. 9, the application 451 for reproducing a moving image may detect an operation with respect to the moving image list item 518a and the operation object 518b through use of the input data 441 indicating the absolute position of the operation position on the touch panel 350.

When the application 451 for reproducing a moving image corresponds to the input data 442, the application 451 is capable of specifying the operated moving image list item 518a and the operated operation project 518b with reference to the input data 442. Thus, a moving image reproduction operation can be executed in accordance with the operation.

Figure 10:
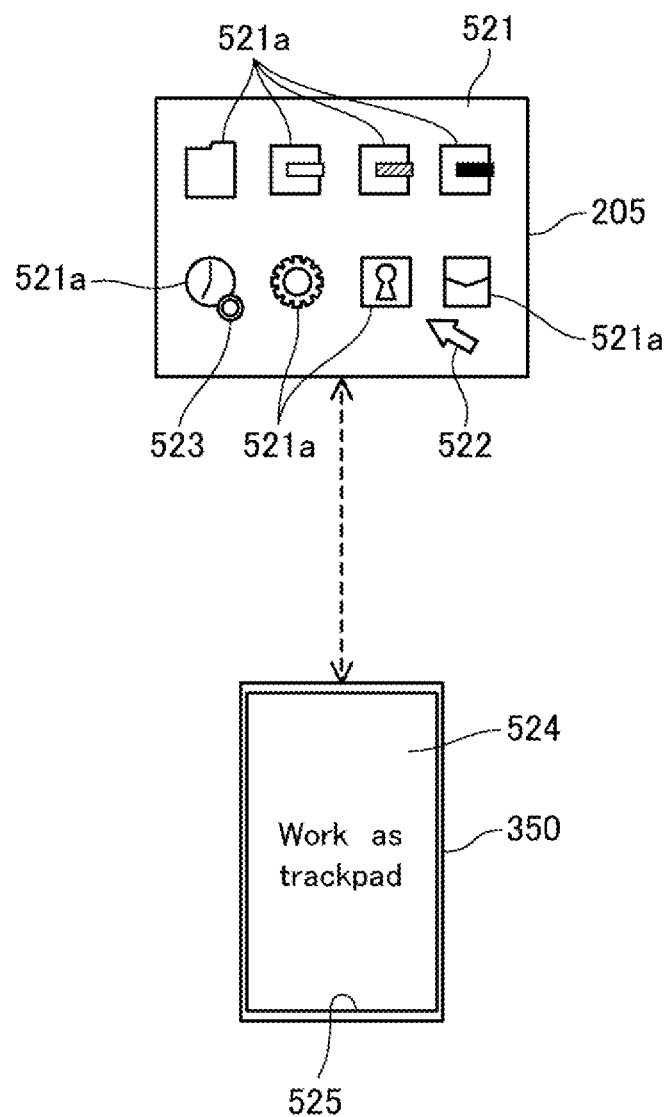
FIG. 10 is a schematic view illustrating an example of a display mode of the display system.

FIG. 10 illustrates a trackpad mode as an example of the display modes of the display system 1. In the trackpad mode, the touch panel 350 functions as an input device for performing a touch operation. The trackpad mode corresponds to an input pad mode of the present disclosure.

In the trackpad mode, a trackpad screen 524 is displayed on the LCD 331. The trackpad screen 524 may be a screen that does not include displayed objects and is viewed as a non-display state. Further, for example, the LCD 331 may cause the trackpad screen 524 to include a guide 525 as illustrated in FIG. 10, and the touch panel 350 may show the user a detection region for detecting an operation as a trackpad. Further, as illustrated in FIG. 10, the trackpad screen 524 may include a character string indicating that the touch panel 350 functions as a trackpad.

In the trackpad mode, the user U performs an operation on a home screen 521, which is displayed on the display unit 205 by the touch panel 350. The objects 521a such as icons corresponding to the applications 451 are arranged on the home screen 521. A pointer 522 or a cursor 523 indicating an operation position on the touch panel 350 is displayed on the home screen 521. The user U operates the touch panel 350 while viewing the pointer 522 or the cursor 523.

In the trackpad mode, the application 451 for displaying the home screen 521 may be operated with reference to the input data 441 including the absolute position of the operation position.

In the trackpad mode, the UI application 452 converts the input data 441 to the operation position on the display unit 205, and generates the input data 442. Specifically, the data obtained by converting the operation position on the touch panel 350 to the operation position on the display unit 205 having a different aspect ratio or a different shape is provided as the input data 442. In this case, the application 451 is capable of detecting an operation with respect to the object 521a based on the objects 521a arranged on the display unit 205 and the input data 442.

The input data 442 indicates a converted operation position with the display unit 205 as a reference, and hence is capable of displaying the pointer 522 or the cursor 523 in accordance with the input data 442.

The trackpad mode can be regarded as a display mode obtained by modifying the mirroring mode illustrated in FIG. 8. For example, in the control device 300, a display mode for displaying a home screen may be set in advance. In this case, the CO control unit 310 refers to a setting when display of the home screen is instructed, and executes any one of the operation of displaying the home screens 515 and 516 in the mirroring mode and the operation of displaying the home screen 521 in the trackpad mode.

Figure 11A:
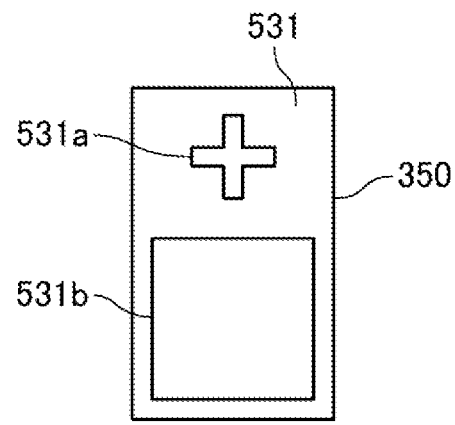
FIGS. 11A-11C are a schematic view illustrating an example of a display mode of the display system.
Figure 11B:
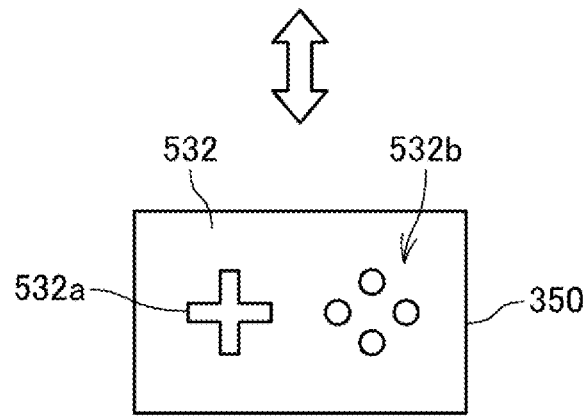
Figure 11C:
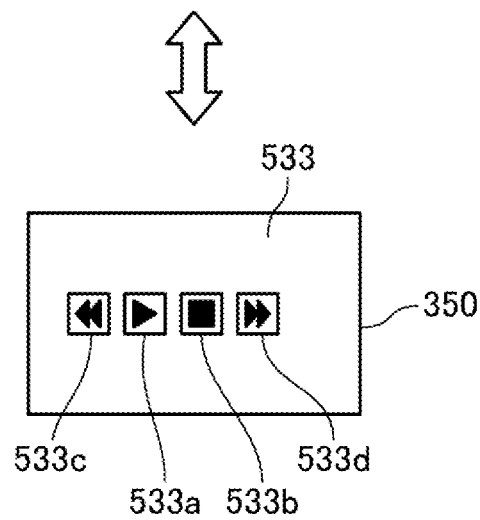

FIG. 11 illustrates a virtual device mode as an example of the display modes of the display system 1. In the virtual device mode, the touch panel 350 functions as an input device such as a so-called game pad. FIG. 11 illustrates display examples of the touch panel 350 in the virtual device mode. FIG. 11A is a display example in a first virtual device mode, FIG. 11B is a display example in a second virtual device mode, and FIG. 11C is a display example in a third virtual device mode.

In the first virtual device mode, an input device screen 531 is displayed on the touch panel 350. As display objects, an object 531a and a guide image 531b are arranged on the input device screen 531. The object 531a is shaped like a direction key, and the guide image 531b indicates a region functioning as a trackpad. The object 531a is an image shaped like a so-called cross key obtained by integrating keys indicating upper, lower, right, and left directions. The user U performs a touch operation on a position of the object 531a, and thus performs an operation similar to that with the cross key. The user U performs a touch operation within a frame of the guide image 531b, and thus performs an operation similar to that with a trackpad.

During executing the first virtual device mode, the sensor data providing unit 401 provides the input data 442 indicating an operation with respect to the object 531a and the guide image 531b based on the input data 441. In this case, the input data 442 includes operation data indicating the upper, lower, right, and left directions of the object 531a and the coordinate of the operation position in the guide image 531b.

The input data 441 is data relating to the absolute coordinate of the operation position on the entire touch panel 350. The UI application 452 acquires, from the coordinate data in the input data 441, coordinate data in a range designated on the input device screen 531, and converts the coordinate data to coordinate data with the display unit 205 or an entire operation region set in advance as a reference. With this, the input data 442 is input data similarly in a case where a hardware input device having the same appearance as the input device screen 531 is used.

In the second virtual device mode, an input device screen 532 is displayed on the touch panel 350. As display objects, an object 532a shaped like a direction key and an object group 532b including a plurality of objects shaped like buttons are arranged on the input device screen 532. Similarly to the object 531a, the object 532a is an object shaped like a cross key. The user U performs a touch operation on a position of the object 532a, and thus performs an operation similar to that with a cross key. Further, the user U performs a touch operation on a position of each of the objects in the object group 532b, and thus performs an operation similar to that with a hardware key.

During executing the second virtual device mode, the sensor data providing unit 401 provides the input data 442 indicating an operation with respect to the object 532a and the object group 532b based on the input data 441. In this case, the input data 442 includes operation data including the upper, lower, right, and left directions of the object 532a and an operation with respect to each of the objects in the object group 532b.

The UI application 452 converts the input data 441 including data relating to the absolute coordinate of the entire touch panel 350 based on the display positions of the object 532a and the object group 532b, and generates the input data 442. With this, the input data 442 is input data similarly in a case where a hardware input device having the same appearance as the input device screen 532 is used.

In the first virtual device mode and the second virtual device mode, a screen for the application 451, which uses a cursor operation with the objects 531a and 532a, is displayed on the display unit 205. For example, the application 451 for playing games or drawing pictures can be used. Further, in the first virtual device mode and the second virtual device mode, the home screen 521 may be displayed on the display unit 205. In this case, for example, an operation of shifting the pointer 522 with the objects 531a and 532a may be performed.

In the third virtual device mode, an input device screen 533 is displayed on the touch panel 350. As display objects, objects 533a, 533b, 533c, and 533d shaped like keys for operations relating to reproduction of a sound and a video are arranged on the input device screen 533. In the example of FIG. 11C, the object 533a is shaped like a reproduction key, the object 533b is shaped like a top key, the object 533c is shaped like a backward key, and the object 533d is shaped like a forward key. The user U performs a touch operation on a display position of each of the objects 533a, 533b, 533c, and 533d, and thus performs an operation similar to that with a hardware key. In the third virtual device mode, for example, the reproduction screen 519 is displayed on the display unit 205.

During executing the third virtual device mode, the sensor data providing unit 401 provides the input data 442 indicating an operation with respect to the objects 533a, 533b, 533c, and 533d based on the input data 441. In this case, the input data 442 includes data indicating, for example, an operation with respect to the reproduction key, the stop key, the backward key, or the forward key.

The UI application 452 converts the input data 441 including data relating to the absolute coordinate of the entire touch panel 350 based on the display positions of the objects 533a, 533b, 533c, and 533d, and generates the input data 442. With this, the input data 442 is input data similarly in a case where a hardware input device having the same appearance as the input device screen 532 is used.

As described above, in the first, second, and third virtual device modes, the touch panel 350 can virtually function in place of a hardware input device. Thus, the application 451 produced on the premises of use of a hardware input device can be operated with the touch panel 350.

Figure 12:
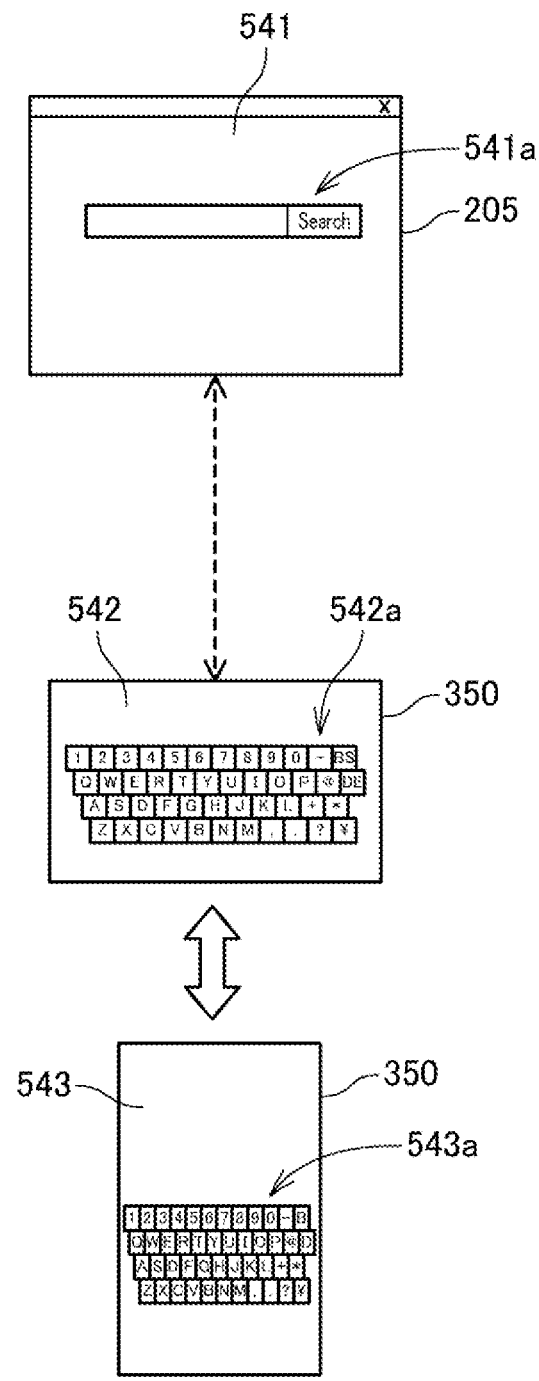
FIG. 12 is a schematic view illustrating an example of a display mode of the display system.

FIG. 12 illustrates a software keyboard mode as an example of the display modes of the display system 1. The software keyboard mode is a mode for inputting characters, which is executed when characters are input through use of the touch panel 350. The software keyboard mode corresponds to an example of a character input mode of the present disclosure.

A character input screen 541 on which character input part 541a is arranged is displayed on the display unit 205. For example, the character input screen 541 is displayed when the application 451 of a web browser receives a search character stripe or an input of a URL.

A keyboard screen 542 on which a software keyboard 542a is arranged is displayed on the touch panel 350. The software keyboard 542a is an input image shaped like a keyboard. When the control device 300 is used longitudinally, a keyboard screen 543 can be used on the touch panel 350 in place of the keyboard screen 542. The keyboard screen 543 includes a software keyboard 543a corresponds to the case where the touch panel 350 is longitudinal. The software keyboard 543a may be an image having a less number of keys as compared to the software keyboard 542a.

In the software keyboard mode, the user U performs an operation with respect to the software keyboards 542a and 543a with the touch panel 350, and thus a character is input in the character input part 541a.

The UI application 452 converts the input data 441 to an operation position on the software keyboards 542a and 543a, and generates the input data 442 including the operated character or symbol. Specifically, the data obtained by converting the operation position on the touch panel 350 to the operated key on the software keyboards 542a and 543a is provided as the input data 442. In this case, the application 451 can be execute an operation in accordance with the key input.

7. Operation of Control Device

Figure 13:
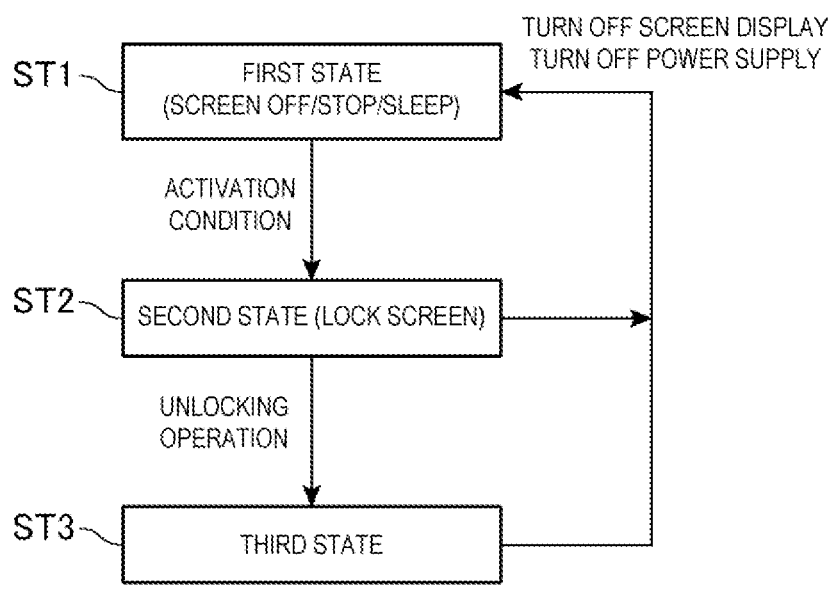
FIG. 13 is an explanatory view illustrating transition of operation states of the display system.

FIG. 13 is an explanatory view illustrating transition of operation states of the display system 1.

The operation states of the display system 1 are roughly divided into three states including a first state ST1, a second state ST2, and a third state ST3.

The first state ST1 is a state in which the HMD 100 and the control device 300 do not perform display. The first state ST1 includes a state in which the HMD 100 and the control device 300 are capable of performing a normal operation and display turns off. Further, the first state ST1 includes a stop state and a sleep state of the HMD 100 and the control device 300.

The stop state is a state in which the power supply to the control device 300 or both the HMD 100 and the control device 300 turns off. The sleep state is a so-called power saving state, and the HMD 100 and the control device 300 do not perform display. In the sleep state, the control device 300 operates minimal function units including the CO control unit 310, the CO input unit 335, and the I/F unit 343, and stops the other function units. In the sleep state, the HMD 100 may operate minimal function units including the DP control unit 120 and the I/F unit 110, and the power may not be supplied to the other function units.

When the control device 300 and the HMD 100 are capable of performing a normal operation in the first state ST1, the CO control unit 310 is capable of executing the application 451 in a mode without screen display.

The second state ST2 is a state in which at least any one of the HMD 100 and the control device 300 displays a lock screen in accordance with control of the control device 300. The function units of the HMD 100 and the control device 300 are capable of executing a normal operation. The second state ST2 may be referred to as a locked state.

In the second state ST2, an operation of activating and stopping the application 451 and the like cannot be received. The second state ST2 continues until the user U performs an unlocking operation set in advance. For example, even when an operation other than the unlocking operation is performed, display of the lock screen is maintained. In the second state ST2, the CO control unit 310 is capable of executing the application 451 as a background in a mode without screen display.

The third state ST3 corresponds to a normal operation state of the display system 1. In the third state ST3, the HMD 100 displays an image on the image display unit 20 based on the display data transmitted from the control device 300. The control device 300 receives an operation on the touch panel 350, executes the application 451, and displays an image on the touch panel 350.

When an activation condition set in advance is satisfied, the CO control unit 310 performs transition from the first state ST1 to the second state ST2 in the display system 1. Examples of the activation condition include an operation of the switch 337 and the like. For example, the activation condition when the control device 300 is in the sleep state corresponds to pressing of the switch 337. The activation condition when the control device 300 is in the stop state corresponds to an operation of pressing the switch 337 for a predetermined time period or more.

The activation condition is not limited to an operation of the switch 337, but is only required to be an operation that can be detected by the CO control unit 310. For example, the activation condition may be an operation of moving the main body of the control device 300. In this case, the CO control unit 310 is capable of determining a drive condition with the CO six-axis sensor 323 and the CO magnetic sensor 324 that detect motion or displacement of the control device 300. Further, motion of body parts such as an arm and a leg of the user U, which is captured as an image by the CO camera 322, or motion of an instruction body such as a device held by the user U in a hand may be set as the activation condition. In this case, the CO control unit 310 is capable of determining the activation condition based on an image captured by the CO camera 322. Further, the activation condition may be an operation with respect to the operation unit 140, or may be an operation detected by the DP outer camera 61 mounted to the image display unit 20 and the various sensors. For example, the CO control unit 310 may determine the activation condition constituted of motion of the body of the user U and motion of an instruction body such as a device held by the user U by a hand, based on an image captured by the DP outer camera 61. Further, motion of the head of the user U wearing the image display unit 20 may be the activation condition. Further, an operation of patting or tapping the image display unit 20 may be the activation condition. In this case, based on detection values obtained by the DP six-axis sensor 235, the DP magnetic sensor 237, or a touch sensor (not shown) mounted to the image display unit 20, the CO control unit 310 is capable of determining presence or absence of the activation condition. That is, in a configuration in which the image display unit 20 includes a touch sensor and a touch operation by the user U can be detected, the touch operation on the touch sensor may be the activation condition. In this case, conditions may be provided to a change, track, and the like of an operation position of the touch operation, and the touch operation in the mode set in advance may be the activation condition.

When the unlocking operation set in advance is performed in the second state ST2, the CO control unit 310 perform transition to the third state ST3 in the display system 1. The unlocking operation may be an operation detected by the CO input unit 335 or an operation detected by the CO camera 322 or the various sensors. For example, an operation of moving the main body of the control device 300 may be the unlocking operation. In this case, the CO six-axis sensor 323 and the CO magnetic sensor 324 detect motion or displacement of the control device 300, and thus the CO control unit 310 is capable of determining presence or absence of the unlocking operation. Further, motion of body parts such as an arm and a leg of the user U, which is captured as an image by the CO camera 322, or motion of an instruction body such as a device held by the user U in a hand may be set as the unlocking operation. In this case, the CO control unit 310 is capable of determining presence or absence of the unlocking operation based on an image captured by the CO camera 322. Further, the unlocking operation may be an operation with respect to the operation unit 140, or may be an operation detected by the DP outer camera 61 mounted to the image display unit 20 and the various sensors. Specific examples of the unlocking operation include an operation of touching the touch panel 350 with a specific track. For example, the CO control unit 310 may determine presence or absence of the unlocking operation constituted of motion of the body of the user U and motion of an instruction body such as a device held by the user U by a hand, based on an image captured by the DP outer camera 61. Further, motion of the head of the user U wearing the image display unit 20 may be the unlocking operation. Further, an operation of patting or tapping the image display unit 20 may be the unlocking operation. In this case, based on detection values obtained by the DP six-axis sensor 235, the DP magnetic sensor 237, or a touch sensor (not shown) mounted to the image display unit 20, the CO control unit 310 is capable of determining presence or absence of the unlocking operation.

When an operation of turning off the screen display or an operation of turning off the power supply is performed in the second state ST2, the CO control unit 310 performs transition to the first state ST1. In this case, the operation may be an operation different from the unlocking operation. For example, pressing of the switch 337, pressing of the switch 337 for a predetermined time period or more, and the like are exemplified. The operation is only required to be detected by the control device 300 and the HMD 100.

When an operation of turning off the screen display or an operation of turning off the power supply is performed in the third state ST3, the CO control unit 310 performs transition to the first state ST1. In this case, the operation is not limited as long as it can be detected by the control device 300 and the HMD 100. For example, pressing of the switch 337, pressing of the switch 337 for a predetermined time period or more, and the like are exemplified.

Figure 14:
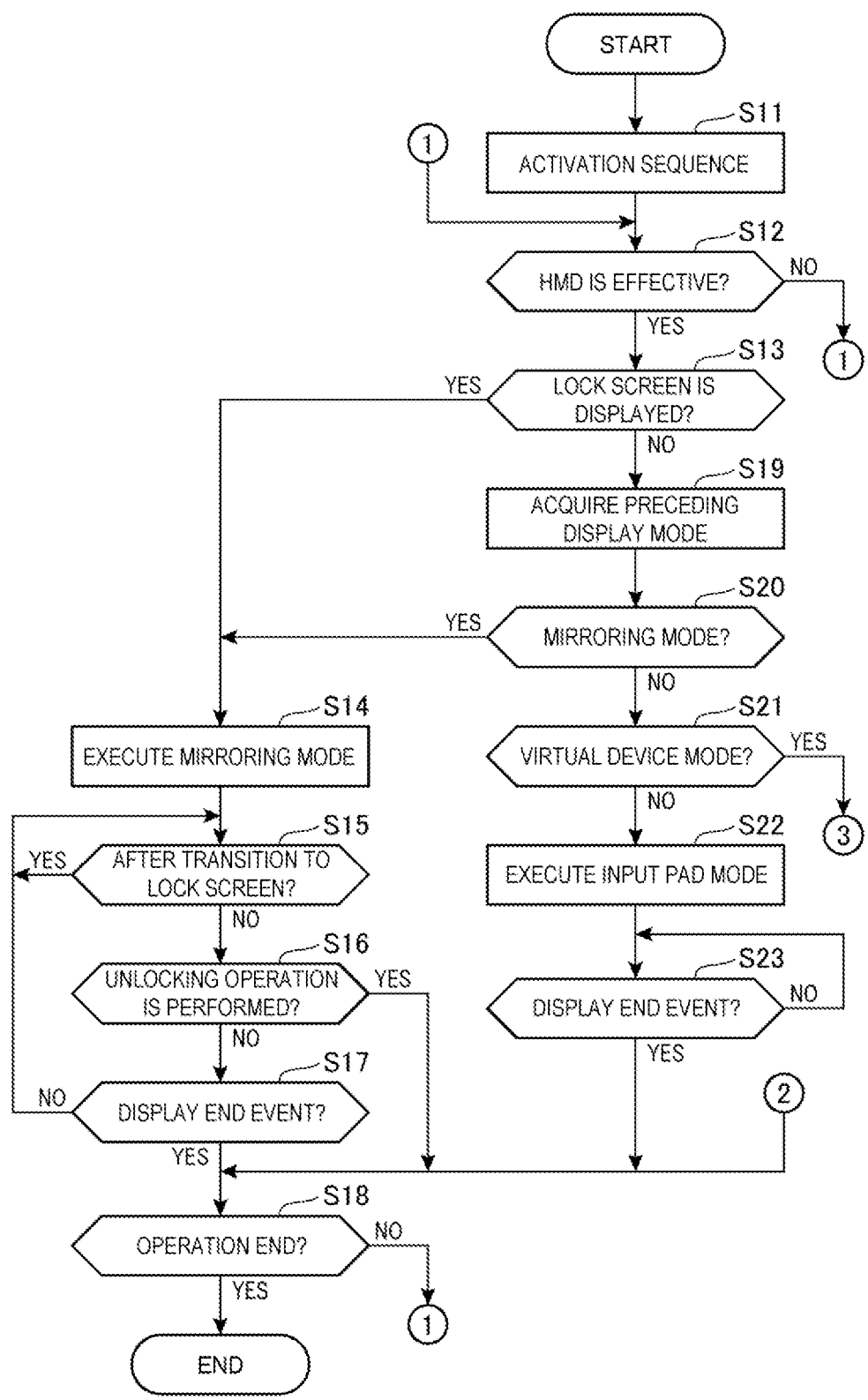
FIG. 14 is a flowchart illustrating an operation of the control device.
Figure 15:
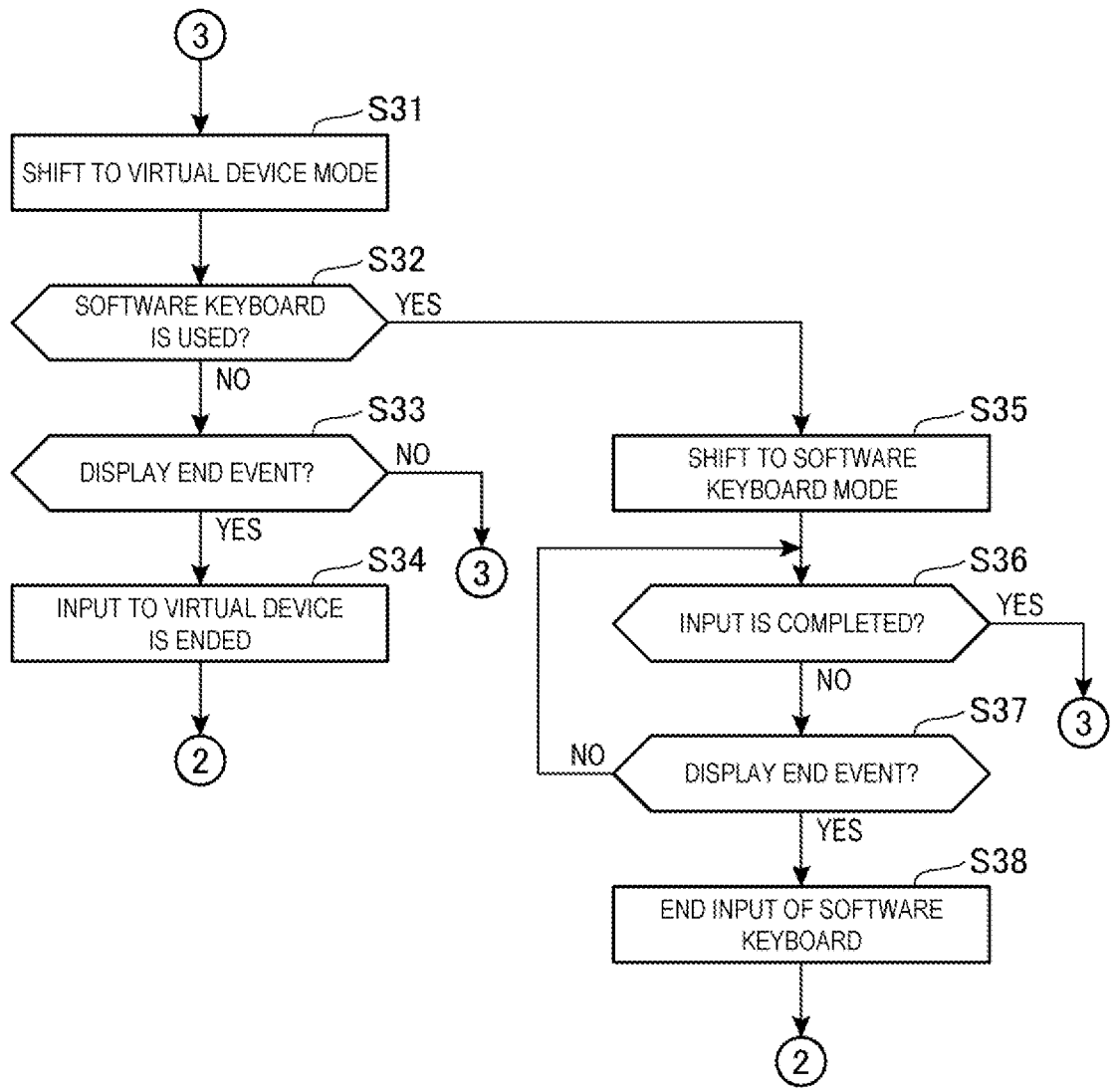
FIG. 15 is a flowchart illustrating an operation of the control device.

FIG. 14 and FIG. 15 are flowcharts illustrating operations of the control device 300, and illustrate operations relating to selection of the display modes of the display system 1.

The operation in FIG. 14 is started under a state in which the power supply to the control device 300 is in an off state. The CO control unit 310 executes an activation sequence when the activation condition is satisfied, which is regarded as a trigger (step S11). With this, the control device 300 performs transition from the first state ST1 to the second state ST2.

After the activation sequence, the CO control unit 310 determines whether the HMD 100 is effective (step S12). In step S12, the HMD 100 is coupled to the control device 300, and it is determined whether the HMD 100 operates effectively in accordance with control of the control device 300.

When the HMD 100 is not effective (step S12; NO), the CO control unit 310 stands by in step S12. When the HMD 100 is effective (step S12; YES), the CO control unit 310 determines whether to display the lock screen (step S13). For example, when the control device 300 is activated to execute step S13 first, the lock screen is displayed.

When the lock screen is displayed (step S13; YES), the CO control unit 310 sets the display mode of the display system 1 to the mirroring mode (step S14). With this, when transition is performed from the first state ST1 to the second state ST2 in the display system 1, the mirroring mode is executed.

The CO control unit 310 determines whether a state of displaying the lock screen first is established (step S15).

When the state of displaying the lock screen first is established, that is, step S15 is executed for the first time after transition to the second state ST2, the CO control unit 310 provides positive determination (step S15; YES). In this case, the CO control unit 310 stands by in step S15. When processing is performed after displaying the lock screen (step S15; NO), the CO control unit 310 determines whether the unlocking operation is performed (step S16).

When the unlocking operation is not performed, or an operation with respect to the touch panel 350 does not correspond to the unlocking operation, the CO control unit 310 provides negative determination (step S16; NO). In this case, the CO control unit 310 determines presence or absence of an event of ending the display in the display system 1 (step S17). For example, the event of ending the display in the display system 1 corresponds to an event in which the HMD 100 is discoupled from the control device 300. When the event of ending the display is present (step S17; YES), the CO control unit 310 determines whether the operation of the control device 300 is ended (step S18). When the operation is ended (step S18; YES), the CO control unit 310 executes an ending sequence, and the present processing is ended. When the operation is not ended (step S18, NO), the CO control unit 310 returns to step S12.

When the unlocking operation is performed (step S16; YES), the CO control unit 310 performs transition from the second state ST2 to the third state ST3 in the display system 1, and transition is performed to an operation in step S18.

When the event of ending the display in the display system 1 is not present (step S17; NO), the CO control unit 310 returns to step S15.

Meanwhile, when the display system 1 does not display the lock screen (step S13; NO), the CO control unit 310 acquires information indicating a display mode executed before step S12, that is, a preceding display mode (step S19). For example, the CO control unit 310 causes the nonvolatile memory 313 to store information indicating a current display mode, and updates the information each time when the display modes of the display system 1 are switched. The CO control unit 310 determines whether the preceding display mode is the mirroring mode (step S20). When the preceding display mode is in the mirroring mode (step S20; YES), the CO control unit 310 performs transition to step S14.

When the preceding display mode is not the mirroring mode (step S20; NO), the CO control unit 310 determines whether the preceding display mode is the virtual device mode (step S21). When the preceding display mode is not the virtual device mode (step S21; NO), the CO control unit 310 sets the display mode of the display system 1 to the trackpad mode (step S22). The CO control unit 310 determines presence or absence of the event of ending the display in the display system 1 (step S23). When the event of ending the display is present (step S23; YES), transition is performed to step S18. When the event of ending the display is not present (step S23; NO), the CO control unit 310 continues the trackpad mode in step S23.

When the preceding display mode is the virtual device mode (step S21; YES), the CO control unit 310 sets the display mode of the display system 1 to the virtual device mode (step S31). Here, the CO control unit 310 determines whether a state of using the software keyboard is established (step S32). When the software keyboard is not used (step S32; NO), the CO control unit 310 determines presence or absence of the event of ending the display in the display system 1 (step S33). When the event of ending the display is present (step S33; YES), the CO control unit 310 ends the virtual device mode (step S34), and transition is performed to step S18. When the event of ending the display is not present (step S33; NO), the CO control unit 310 returns to step S31.

In step S32, when a screen displayed by the application 451 is a screen requiring a character input, or start of a character input is instructed by an operation on the touch panel 350, the CO control unit 310 provides positive determination (step S32; YES). In this case, the CO control unit 310 executes the software keyboard mode (step S35). The CO control unit 310 determines whether an input with the software keyboard is completed (step S36). When the input is completed (step S36; YES), the CO control unit 310 returns to step S31, and switches the display mode to the virtual device mode.

When the input with the software keyboard is not completed (step S36; NO), the CO control unit 310 determines presence or absence of the event of ending the display in the display system 1 (step S37). When the event of ending the display is present (step S37; YES), the CO control unit 310 ends the software keyboard mode (step S38), and transition is performed to step S18. When the event of ending the display is not present (step S37; NO), the CO control unit 310 returns to step S36.

In the operations illustrated in FIG. 14 and FIG. 15, when the display mode is switched, the CO control unit 310 may perform an operation of notifying the switching of the display mode to the user U. For example, the display on the display unit 205 is not changed along with the switching of the display mode, the CO control unit 310 performs generation of vibration with the vibrator 326 and/or a sound output with the sound output unit 327. With this, the switching of the display mode may be notified. Specifically, change of the virtual device mode among the first, second, and third virtual device modes, change from the virtual device mode to the software keyboard mode, and vice versa are exemplified. In those cases, the CO control unit 310 may generate display data for display a message notifying the switching of the display mode, and may transmit the display data to the HMD 100. Moreover, the CO control unit 310 may generate display data for displaying information relating to a display mode before the change or the after the change, and may transmit the display data to the HMD 100. Further, when the display on the display unit 205 is changed along with the switching of the display mode, the CO control unit 310 may generate display data for displaying information relating to a display mode before the change or the after the change, may transmit the display data to the HMD 100, and may perform notification with the display on the display unit 205. Further, in the exemplary embodiment described above, as illustrated in FIG. 14 and FIG. 15, description is made on the case where the display mode is set to the mirroring mode when the CO control unit 310 performs transition from the first state ST1 to the second state ST2 and the unlocking operation is required, as an example. When performing transition from the second state ST2 to the third state ST3, the CO control unit 310 may switch the display mode to the mirroring mode. Further, when performing transition from the second state ST2 to the third state ST3, the CO control unit 310 may also switch the display mode to the mirroring mode, and other examples can be achieved.

8. Actions and Effects of Exemplary Embodiment

As described above, the display system 1 in the exemplary embodiment to which the present disclosure is applied includes the HMD 100 including the image display unit 20 and the control device 300 coupled to the HMD 100. The control device 300 includes the LCD 331 and the touch sensor 336 arranged to overlap the LCD 331. The display system 1 includes the plurality of display modes including the first display mode and the second display mode. In the first display mode, the display on the image display unit 20 and the display on the LCD 331 are common. In the second display mode, the display on the image display unit 20 and the display on the LCD 331 are different from each other. The display system 1 is capable of executing the first state ST1 in which at least any one of the display on the image display unit 20 and the display on the LCD 331 is stopped, the second state ST2 in which a specific operation is requested, and the third state ST3 in which the application 451 can be executed. During specific transition among transition from the first state ST1 to the other states, transition from the second state ST2 to the other states, and transition from the third state ST3 to the other states, the display system 1 sets the display mode of the image display unit 20 and the LCD 331 to the first display mode.

In a display method executed by the display system 1, the plurality of display modes including the first display mode and the second display mode are executed. In the first display mode, the display on the image display unit 20 and the display on the LCD 331 are common. In the second display mode, the display on the image display unit 20 and the display on the LCD 331 are different from each other. There can be executed the first state ST1 in which at least any one of the display on the image display unit 20 and the display on the LCD 331 is stopped, the second state ST2 in which a specific operation is required, and the third state ST3 in which the application 451 can be executed. During specific transition among transition from the first state ST1 to the other states, transition from the second state ST2 to the other states, and transition from the third state ST3 to the other states, the display mode of the image display unit 20 and the LCD 331 is set to the first display mode.

A program executed by the CO control unit 310 of the control device 300 can perform switching among the plurality of display modes including the first display mode and the second display mode. In the first display mode, the display on the image display unit 20 and the display on the LCD 331 are common. In the second display mode, the display on the image display unit 20 and the display on the LCD 331 are different from each other. The first state ST1 in which at least any one of the display on the image display unit 20 and the display on the LCD 331 is stopped, the second state ST2 in which a specific operation is requested, and the third state ST3 in which the application 451 can be executed are switched and executed. During specific transition among transition from the first state ST1 to the other states, transition from the second state ST2 to the other states, and transition from the third state ST3 to the other states, the display mode of the image display unit 20 and the LCD 331 is set to the first display mode.

The display modes that can be executed by switching performed by the display system 1 include, for example, the mirroring mode, the expanded screen mode, the trackpad mode, the virtual device mode, and the software keyboard mode. For example, the first display mode is the mirroring mode. The second display mode is selected from the expanded screen mode, the trackpad mode, the virtual device mode, and the software keyboard mode. The first virtual device mode, the second virtual device mode, and the third virtual device mode may be regarded as display modes different form one another, and may be regarded as different aspects of one virtual device mode.

Specific transition is transition set in advance, which is selected among, for example, transition from the first state ST1 to the second state ST2, transition from the second state ST2 to the third state ST3, and transition from the third state ST3 to the first state ST1. For example, transition from the first state ST1 to the second state ST2 is performed, the display system 1 sets the display mode of the image display unit 20 and the LCD 331 to the first display mode.

According to the display system 1, the display method executed by the display system 1, and the program, while the state of the display system 1 has transition between the first state ST1, the second state ST2, and the third state ST3, the first display mode in which the display on the image display unit 20 and the display on the LCD 331 are common is executed. Thus, the user U can perform a specific operation while viewing any desired one of the display on the touch panel 350 and the display on the display unit 205. Thus, when it is difficult to execute the operation by feel, the user U can easily perform the unlocking operation simply by viewing any one of the display unit 205 and the touch panel 350. With this, when the image display unit 20 and the LCD 331 being two display units are used, the user U can perform an intuitive operation. Particularly, in a case where an operation with respect to the touch panel 350 is performed similarly to the unlocking operation described above, when the mirroring mode is executed in the second state ST2, the operation can be performed easily while viewing the display on the touch panel 350 regardless of the display state of the display unit 205. Therefore, convenience when the user U uses a plurality of display units can be improved.

For example, transition from the first state ST1 to the second state ST2 is performed, the display system 1 sets the display mode of the image display unit 20 and the LCD 331 to the first display mode. For example, the specific operation requested in the second state ST2 is the unlocking operation described above, and it is difficult for the user U to execute the operation by feel in some cases. In the display system 1, when transition to the second state ST2 is performed, and the unlocking operation is requested, the user U can easily perform the unlocking operation simply by viewing any one of the display unit 205 and the touch panel 350. Thus, when the image display unit 20 and the LCD 331 being two display units are used, the user U can perform an intuitive operation. Particularly, in a case where an operation with respect to the touch panel 350 is performed similarly to the unlocking operation described above, when the mirroring mode is executed in the second state ST2, the operation can be performed easily while viewing the display on the touch panel 350 regardless of the display state of the display unit 205. Therefore, convenience when the user U uses a plurality of display units can be improved.

The HMD 100 is a head-mounted display device including the image display unit 20 mounted on the head of the user U. Thus, when it is difficult for the user U to perform an operation by feel while wearing the image display unit 20, the display mode is set to the first display mode. With this, convenience of the operation can be improved. Moreover, in a case of a display unit that displays an image in such a way that an external scene can be visually recognized similarly to the image display unit 20, the user U wearing the image display unit 20 can perform an operation while viewing the touch panel 350. Thus, an operation that does not depend only on the display on the image display unit 20 can be performed, and hence convenience can be improved more.

For example, when the user U performs the unlocking operation while wearing the image display unit 20, the image display unit 20 causes the user U to visually recognize the lock screen. Meanwhile, when the screen is not displayed on the touch panel 350, the user U is required to operate the touch panel 350 or other operation units while depending on the display on the image display unit 20. In this case, according to the display system 1, the display is set to the mirroring mode. Thus, even when the user U wears the image display unit 20, the user U can perform the unlocking operation while viewing the display on the touch panel 350.

The HMD 100 includes the display control unit 124 that controls the display on the image display unit 20 based on the data input from the control device 300. The control device 300 includes the CO control unit 310 that generates the data for controlling the display on the image display unit 20, controls the display on the LCD 331, and executes the application 451. When the activation condition is satisfied in the first state ST1, the CO control unit 310 causes the control device 300 to have transition to the second state ST2. When the specific operation is detected by the touch sensor 336 in the second state ST2, the CO control unit 310 causes the control device 300 to have transition to the third state ST3. In this configuration, the operation state of the display system 1 in which the CO control unit 310 enables the display unit 205 and the touch panel 350 to be used as display units can be controlled as appropriate by the control device 300. Further, when transition is performed from the first state ST1 to the second state ST2, the display on the display unit 205 and the display on the touch panel 350 are common. Thus, the user U can easily perform an operation with respect to the control device 300 that controls the display system 1 while wearing the image display unit 20.

When the specific operation is detected by the touch sensor 336, transition from the second state ST2 to the third state ST3 is performed in the display mode set in advance. With this, the user U can perform unlocking by a touch operation with respect to the control device 300, and can cause the application 451 to be executed.

The control device 300 includes the CO input unit 335 including the switch 337, and performs transition from the first state ST1 to the second state ST2 in accordance with an operation with respect to the CO input unit 335. In this configuration, the user U can cause the display system 1 to have transition from the first state ST1 to the second state ST2 by a simple operation.

The display system 1 may notify a running display mode in the display on the image display unit 20. In this case, the user U can be reliably notified with the switching of the display modes in the display on the image display unit 20 that the user U wears.

The second display mode includes any of the virtual device mode, the software keyboard mode, and the input pad mode. Thus, operability of an input operation using the control device 300 can be improved.

When the application 451 requires a character input, the CO control unit 310 switched the display mode to the software keyboard mode. When the character input is completed, the CO control unit 310 executes the display mode before the software keyboard mode. Thus, operability in a case where a character input is performed through use of the control device 300 can be improved even more.

The present disclosure is not limited to the configurations in the exemplary embodiments described above, and the present disclosure can be implemented in various aspects without departing from the gist thereof.

For example, the configuration in which the display system 1 includes the HMD 100 being a head-mounted type display device is given as an example. However, the present disclosure is not limited thereto, and various types of display devices can be adopted. For example, instead of the image display unit 20, for example, another type of image display unit such as an image display unit to be worn like a cap, for example, may be employed. Such an image display unit may include a display unit that displays images corresponding to the left eye of the user U and a display unit that displays images corresponding to the right eye of the user U. Additionally, the display device in the present disclosure may be configured, for example, as a head-mounted display mounted on a vehicle such as a car and an airplane. Further, the display device may be configured, for example, as a head-mounted display built into a body protector tool such as a helmet. In this case, a portion for positioning the device with respect to the body of the user U, and a portion positioned with respect to the portion described earlier can be a mounting section of the head-mounted display device.

The HMD 100 is an example of a display device being an object to which the present disclosure is applied, and is not limited to the configuration illustrated in FIG. 3. For example, in the exemplary embodiment described above, description is made on the configuration in which the image display unit 20 and the coupling device 10 are separated from each other as an example. A configuration in which the image display unit 20 and the coupling device 10 are integrated to be mounted on the head of the user U can be realized. Further, the configuration of the optical system of the image display unit 20 is freely selected. For example, an optical member, which is positioned in front of the eye of the user U and partially or entirely overlaps the field of view of the user U, may be used. Alternatively, a scanning type optical system in which scanning is performed with laser light or the like as imaging light may be adopted. Alternatively, the optical member is not limited to one in which imaging light is guided, and may only have a function of diffracting and/or reflecting imaging light and guides the imaging light to the eye of the user U.

Further, as the display device, a liquid crystal monitor or a liquid crystal television that include a liquid crystal display panel on which an image is displayed may be adopted. A display device including a plasma display panel or an organic EL display panel may be used. In this case, the display panel corresponds to the display unit according to the present disclosure. Further, as the display device, a projector that projects imaging light onto a screen or the like may be used.

Further, for example, in the HMD 100 illustrated in FIG. 3, the coupling device 10 may be configured through use of a USB-Type C connector, a USB-Type C controller, and a USB hub. In this case, the DP outer camera 61 and the other sensors may be coupled to the USB hub. Further, as a controller that controls the display on the right display unit 22 and the left display unit 24 of the image display unit 20, an FPGA that outputs the display data to the right display unit 22 and the left display unit 24 may be arranged in any one of the right display unit 22 and the left display unit 24. In this case, the coupling device 10 may include a bridge controller that couples the USB-Type C controller and the FPGA to each other. Further, in the image display unit 20, a configuration in which the DP six-axis sensor 235, the DP magnetic sensor 237, the EEPROM 215, and the like are mounted on the same substrate as the FPGA may be adopted. Arrangement of the other sensors may be changed as appropriate. For example, the distance sensor 64 and the DP illuminance sensor 65 may be configured to be arranged at positions suitable for measurement or detection and coupled to the FPGA or the USB-Type C controller.

Further, specific specifications of the display device including the OLED units 221 and 241 are not limited. For example, the OLED units 221 and 241 may have a common configuration.

At least some of the functional blocks illustrated in FIG. 3 and FIG. 4 may be realized in the form of hardware or may be realized by a cooperation of hardware and software, and, is not limited to a configuration in which independent hardware resources are arranged as illustrated in the drawings. Further, as the program executed by the processor 311, a configuration in which a program stored in an external device may be acquired via the communication unit 342 or the I/F unit 343 and executed may be obtained.

What is claimed is:

1. A display system, comprising:
a display device that includes a first display unit that displays a first image; and
a control device that is coupled to the display device, the control device including a second display unit and a touch sensor arranged in an overlapping manner with the second display unit, wherein
the display system executes:
a first display mode in which the first display unit displays the first image and the second display unit displays the first image and in which an entirety of display contents displayed on the first display unit is duplicated on the second display unit; and
a second display mode in which the first display unit displays the first image and the second display unit displays a second image different from the first image,
when the display system transitions from a first state to a second state, or the display system transitions from the second state to a third state, the display system executes the first display mode, the first state being a state in which the second display unit stops displaying the first image, the second state being a state in which the control device requests an unlocking operation, and the third state being a state in which the control device executes an application, and
when the display system is in the third state, the display system determines whether a preceding display mode is the first display mode,
when the preceding display mode is determined to be the first display mode, the display system executes the first display mode, and
when the preceding display mode is determined to be the second display mode, the display system determines whether the preceding display mode is a virtual device mode and executes an input mode when the preceding display mode is determined not to be the virtual device mode.

2. The display system according to claim 1, wherein transition from the first state to the second state causes the first display unit and the second display unit to be in the first display mode.

3. The display system according to claim 1, wherein
the display device includes a first display control unit configured to control display on the first display unit based on data input from the control device,
the control device includes a second control device configured to generate data for controlling display on the first display unit, control display on the second display unit, and execute an application, and
the second control unit causes the control device to transition to the second state when an activation condition is satisfied in the first state, and causes the control device to transition to the third state when the unlocking operation is detected by the touch sensor in the second state.

4. The display system according to claim 3, wherein
the unlocking operation corresponds to an unlocking operation for instructing cancellation of a locked state of the control device, and
the second control unit causes the control device to transition to the third state when the unlocking operation is detected by the touch sensor in the second state.

5. The display system according to claim 1, wherein
when the specific operation is detected by the touch sensor, transition from the second state to the third state is performed in a display mode set in advance among the plurality of display modes.

6. The display system according to claim 1, wherein
the control device includes an operation unit including an operation element, and
transition from the first state to the second state is performed in accordance with an operation on the operation unit.

7. The display system according to claim 1, wherein
a current display mode is identified on the first display unit.

8. The display system according to claim 1, wherein
the second display mode includes any of a virtual device mode for displaying a virtual input device on the second display unit, a character input mode for displaying, on the second display unit, a user interface for inputting characters, and an input pad mode for using the second display unit as an input pad.

9. The display system according to claim 8, wherein
the second display mode includes the character input mode, and
the display mode is switched to the character input mode when the application requires character input, and the display mode before the switching to the character input mode is executed when the character input is completed.

10. A display method performed by a display device including a first display unit that displays a first image and a control device to be coupled to the display device, the control device including a second display unit and a touch sensor arranged in an overlapping manner with the second display unit, the display method comprising:
executing a plurality of display modes including:
a first display mode in which the first display unit displays the first image and the second display unit displays the first image and in which an entirety of display contents displayed on the first display unit is duplicated on a the second display unit; and
a second display mode in which the first display unit displays the first image and the second display unit displays a second image different from the first image; and
performing transition between a first state in which the second display unit stops displaying the first image, a second state in which the control device requests an unlocking operation, and a third state in which the control device executes an application, wherein when performing the transition from the first state to the second state, or when performing the transition from the second state to the third state, the display method executes the first display mode,
when the display system is in the third state, the method includes determining whether a preceding display mode is the first display mode,
when the preceding display mode is determined to be the first display mode, the method includes executing the first display mode, and
when the preceding display mode is determined to be the second display mode, the method includes determining whether the preceding display mode is a virtual device mode, and executing an input mode when the preceding display mode is determined not to be the virtual device mode.

11. A non-transitory computer-readable storage medium storing a computer-executable program for controlling a control device being coupled to a display device including a first display unit that displays a first image, the control device including a second display unit and a touch sensor arranged in an overlapping manner with the second display unit, the program being configured to:
- execute a plurality of display modes including (a) a first display mode in which the first display unit displays the first image and the second display unit displays the first image and in which an entirety of display contents displayed on the first display unit is duplicated on a display of the second display unit and (b) a second display mode in which the first display unit displays the first image and the second display unit displays a second image different from the first image;
- performing transition between a first state in which the second display unit stops displaying the first image, a second state in which the control device requests an unlocking operation, and a third state in which the control device executes an application, wherein when performing the transition from the first state to the second state, or when performing the transition from the second state to the third state, the program is configured to execute the first display mode, when the display system is in the third state, the program is configured to determine whether a preceding display mode is the first display mode, when the preceding display mode is determined to be the first display mode, the program is configured to execute the first display mode, and when the preceding display mode is determined to be the second display mode, the program is configured to determine whether the preceding display mode is a virtual device mode, and execute an input mode when the preceding display mode is determined not to be the virtual device mode.

\* \* \* \* \*